US006055509A

United States Patent [19]
Powell

[11] Patent Number: 6,055,509
[45] Date of Patent: Apr. 25, 2000

[54] SYSTEM AND METHOD FOR TRANSFERRING IDENTIFICATION INFORMATION BETWEEN PORTABLE CARDS IN A COMPUTERIZED RETAIL STORE HAVING COMMUNICATION AMONG A PLURALITY OF COMPUTERS

[75] Inventor: Ken R. Powell, P.O. Box 6265, Athens, Ga. 30604

[73] Assignee: Ken R. Powell, Athens, Ga.

[21] Appl. No.: 08/799,689

[22] Filed: Feb. 11, 1997

[51] Int. Cl.⁷ ........................................ G06F 17/60
[52] U.S. Cl. ............................. 705/14; 235/383; 705/30
[58] Field of Search ......................... 705/14, 1, 16, 705/30, 400; 235/383

[56] References Cited

U.S. PATENT DOCUMENTS

| | | | |
|---|---|---|---|
| 4,674,041 | 6/1987 | Lemon et al. | 705/14 |
| 4,882,675 | 11/1989 | Nichtberger et al. | 705/14 |
| 4,896,791 | 1/1990 | Smith | 221/7 |
| 4,937,742 | 6/1990 | Marshall | 705/14 |
| 5,047,614 | 9/1991 | Bianco | 235/385 |
| 5,250,789 | 10/1993 | Johnsen | 705/14 |
| 5,256,863 | 10/1993 | Ferguson et al. | 380/24 |
| 5,380,991 | 1/1995 | Valencia et al. | 235/383 |
| 5,459,306 | 10/1995 | Stein et al. | 235/383 |
| 5,500,517 | 3/1996 | Cagliostro | 235/486 |
| 5,557,721 | 9/1996 | Fite et al. | 705/14 |

OTHER PUBLICATIONS

Latamore, Bert, "The Smart Card," Desktop Computing, Aug. 1982, pp. 46–51.

*Primary Examiner*—Emanuel Todd Voeltz
*Assistant Examiner*—Raquel Alvarez
*Attorney, Agent, or Firm*—Jerome D. Jackson

[57] ABSTRACT

A system for auditing coupon distribution in a retail store. The system includes a plurality of retail stores, each having a coupon-dispensing unit for writing electronic coupons onto portable IC cards carried by each customer. To audit the system, store personnel insert an auditing card into the coupon-dispensing units, to collect the dates and recipients of coupon-dispensing transactions.

29 Claims, 27 Drawing Sheets

COUPON DATA 134
IN MEMORY 820

COUPON DATA 134
IN MEMORY 820

THE FOLLOWING COUPONS WERE DISPENSED AT
ONE DISPENSER DURING A SHORT PERIOD OF TIME IN STORE 34921:

| COUPON | CUSTOMER | TIME |
|---|---|---|
| 500034300760 | 133578983 | December 3, 1994; 22:13 |
| 500034300760 | 133578983 | December 3, 1994; 22:13 |
| 500034300760 | 133578983 | December 3, 1994; 22:13 |
| 500034300760 | 133578956 | December 3, 1994; 22:14 |
| 500034300760 | 133578957 | December 3, 1994; 22:14 |
| 500034300760 | 133578958 | December 3, 1994; 22:14 |
| 500034300760 | 133578959 | December 3, 1994; 22:14 |
| 500034300760 | 133578961 | December 3, 1994; 22:14 |
| 500034300760 | 133578963 | December 3, 1994; 22:14 |
| 500034300760 | 133578964 | December 3, 1994; 22:15 |
| 500034300760 | 133578983 | December 3, 1994; 22:15 |
| 500034300760 | 133578965 | December 3, 1994; 22:16 |
| 500034300760 | 133578945 | December 3, 1994; 22:16 |
| 500034300760 | 133578933 | December 3, 1994; 22:17 |
| 500034300760 | 133578932 | December 3, 1994; 22:17 |
| 500034300760 | 133578926 | December 3, 1994; 22:17 |
| 500034300760 | 133578936 | December 3, 1994; 22:17 |
| 500034300760 | 133578924 | December 3, 1994; 22:17 |
| 500034300760 | 133578906 | December 3, 1994; 22:17 |
| 500034300760 | 133578334 | December 3, 1994; 22:17 |
| 500034300760 | 133578901 | December 3, 1994; 22:19 |
| 500034300760 | 133578923 | December 3, 1994; 22:19 |
| 500034300760 | 133578934 | December 3, 1994; 22:19 |
| 500034300760 | 133578905 | December 3, 1994; 22:20 |
| 500034300760 | 133578912 | December 3, 1994; 22:20 |

Fig. 22

SYSTEM AND METHOD FOR TRANSFERRING IDENTIFICATION INFORMATION BETWEEN PORTABLE CARDS IN A COMPUTERIZED RETAIL STORE HAVING COMMUNICATION AMONG A PLURALITY OF COMPUTERS

BACKGROUND OF THE INVENTION

1. Field of the Invention

This invention relates generally to a system and method for auditing a retail system and, more particularly, to a system and method for auditing a system that provides credits for selected products.

2. Description of Related Art

Discount coupons are a popular means to stimulate sales of products such as grocery store items. In 1992, approximately 310 billion coupons were distributed and 7.7 billion coupons were redeemed, saving customers $4 billion. It has been estimated that in-store couponing coupled with advertising increases sales by 544%. Typical coupon marketing schemes, however, are susceptible to fraud by unscrupulous retailers that misredeems coupons, requesting reimbursement payments by presenting coupons to the clearing house, even though no corresponding products are purchased.

SUMMARY OF THE INVENTION

It is an object of the present invention to provide a system and method for detecting coupon dispensing patterns that may indicate coupon misredemption.

To achieve these and other objects of the present invention, there is a method for a system including a plurality of first cards each having a first memory and respective first signal, a second card, a first computer that receives from the second card, and a store including a plurality of products, a central computer, and a checkout station having an electromagnetic detector and a checkout computer. The method comprises sending a second signal to the first memory of a card in the plurality of first cards, the second signal corresponding to one of the plurality of products. The method further comprises the following steps, performed in the store, of communicating product data between the central computer and the checkout computer; receiving the first signal from the card in the plurality of first cards; sending the first signal to the second card; receiving, in the checkout computer, second signals from the card in the plurality of first cards; receiving a third signal from the electromagnetic detector, the third signal corresponding to a product in the store; and determining a price depending on whether the third signal corresponds to one of the received second signals.

According to another aspect of the present invention, there is a store for a system including a plurality of first cards each having a first memory and respective first signal, a second card, and a first computer that receives from the second card. The store comprises a plurality of products; a central computer; a checkout station including an electromagnetic detector for generating a third signal corresponding to a product, a checkout computer that communicates product data between the checkout computer and the central computer, and receives second signals from a card in the plurality of first cards. The store further comprises a determiner that determines a price depending on whether the third signal corresponds to one of the received second signals; a receiver that receives a first signal from the card in the plurality of first cards; and a sender that sends the first signal to the second card.

According to yet another aspect of the present invention, there is a card processing system in a system including a plurality of first cards each having a first memory and respective first signal, a second card, a first computer that receives from the second card, and a store including a plurality of products, a central computer, and a checkout station having an electromagnetic detector and a checkout computer that communicates product data between the central computer and the checkout computer. The card processing system comprises means for receiving the first signal from a card in the plurality of first cards; means for sending the first signal to the second card; means for receiving second signals from the card in the plurality of first cards; means for receiving a third signal from the electromagnetic detector, the third signal corresponding to a product in the store; and means for determining a price depending on whether the third signal corresponds to one of the received second signals.

According to yet another aspect of the present invention, there is a store for a system including a plurality of first cards each having a first memory and respective first signal, a second card, and a first computer that receives from the second card. The store comprises a plurality of products; a central computer; a checkout station including means for generating a third signal corresponding to a product, means for communicating product data with the central computer, and means for receiving second signals from a card in the plurality of first cards; means for determining a price depending on whether the third signal corresponds to one of the received second signals; means for receiving a first signal from the card in the plurality of first cards; and means for sending the first signal to the second card.

BRIEF DESCRIPTION OF THE DRAWINGS

FIGS. 14A and 14B are diagrams of some memory contents of the customer card at different points in time.

FIGS. 17A and 17B are diagrams of some memory contents of one of the dispensing units at different points in time.

FIG. 22 is a print out from one of the steps shown in FIG. 21.

The accompanying drawings which are incorporated in and which constitute a part of this specification, illustrate embodiments of the invention and, together with the description, explain the principles of the invention, and additional advantages thereof. Throughout the drawings, corresponding parts are labeled with corresponding reference numbers.

DESCRIPTION OF THE PREFERRED EMBODIMENTS

First Preferred Embodiment

Figure 1:
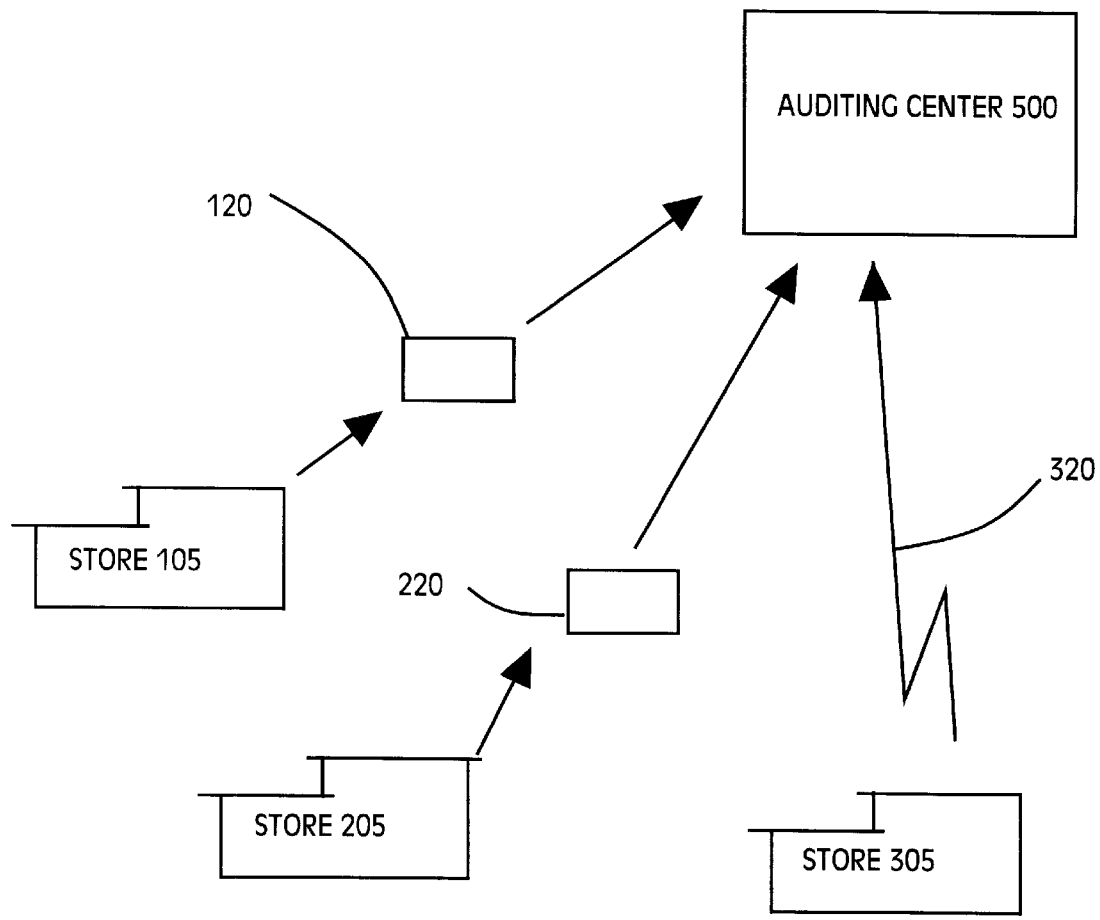
FIG. 1 is a schematic diagram of a retail system in accordance with the first preferred embodiment of the invention.

FIG. 1 shows a retail system in accordance with a first preferred embodiment of the present invention. A coupon dispensing unit within each of store 105, 205, and 305 dispenses coupons to customers in the store. Customers redeem these coupons at a check out station within the store.

Each of stores 105, 205, and 305 sends a respective signal to auditing center 500 via a signal path. The signal path between store 105 and center 500 includes a portable audit card 120. Card 120 is approximately the size of a credit card. Card 120 contains a random access memory for storing an audit card signal. This audit card signal includes the unit ID of a discount coupon dispensing unit from which card 120 collected dispensing data. This audit card signal also includes a UPC coupon ID, which is a 12 digit number identifying the coupon in the format documented by the Uniform Code Council, Inc. of Dayton, Ohio. The audit card signal also includes a list of dispensing transactions, each record in the list including a customer ID and the time that the coupon was dispensed to the customer. The time includes the date and the time of day.

Similarly, audit card 220 sends an audit card signal to auditing center 500, reflecting coupons dispensed by a coupon dispensing unit within store 205.

Store 305 sends coupon dispensing data to auditing center 500 via telephone signal path 320, instead of an audit card.

Figure 2:
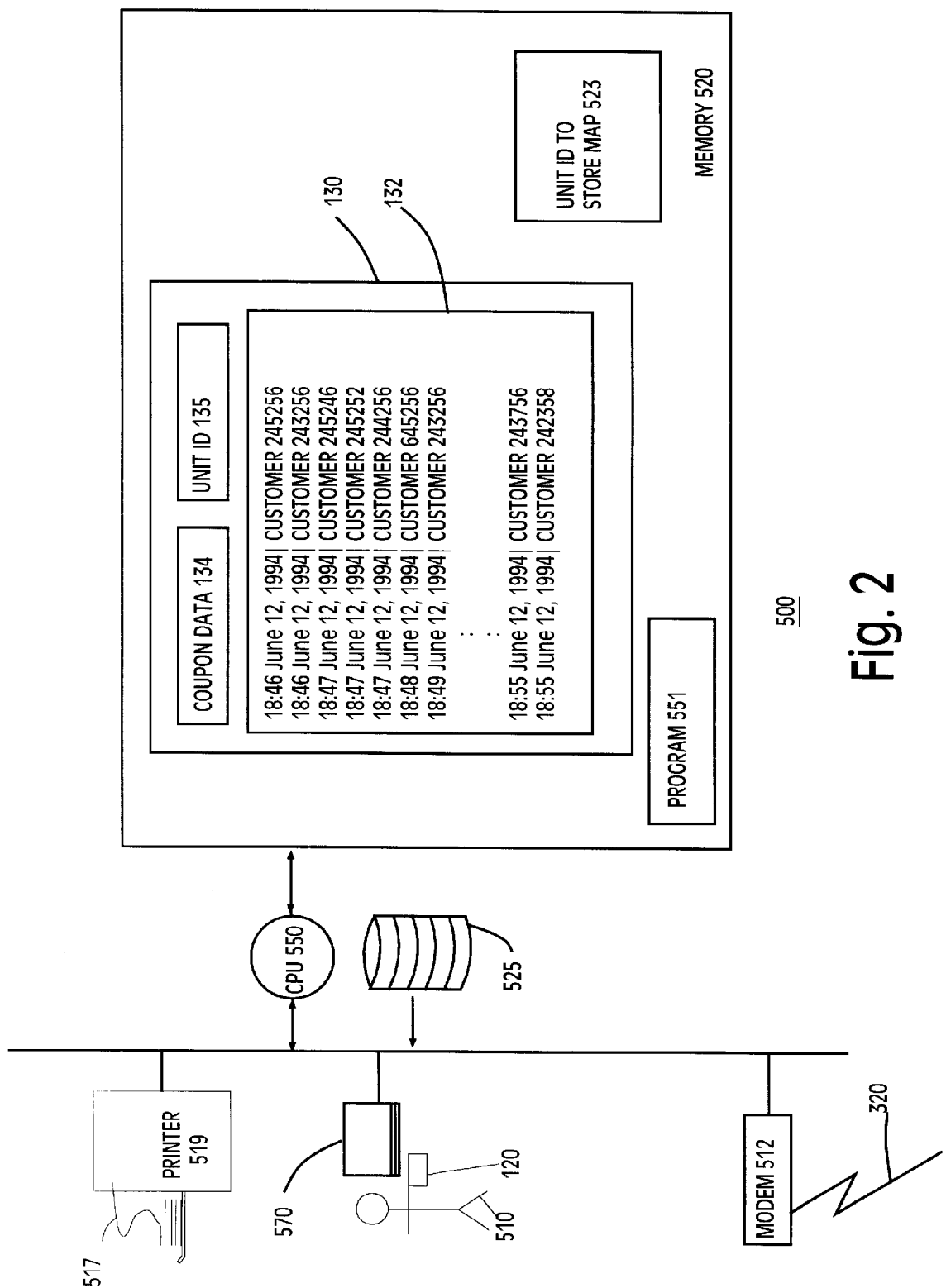
FIG. 2 is a block diagram emphasizing a portion of the system shown in FIG. 1.

FIG. 2 shows a block diagram of auditing center 500. CPU 550 executes system program 551 in random access memory (RAM) 520. Various parts of the data in RAM 520 may be transferred between RAM 520 and disk memory 525 using a virtual memory mapping scheme, as is well known in the art.

Administrator 510 receives audit card 120 through the mail and inserts audit card 120 into card reader 570. CPU 550 and program 551 act to read the audit card signal from card 120, via reader 570. CPU 550 then transfers the audit card signal 130 from card 120 to RAM 520, as shown is FIG. 2. Audit card signal 130 includes coupon data 134, a dispensing unit ID 135, and a list of dispensing transactions 132.

Subsequently, CPU 550 processes the dispensing transactions to detect instances where a relatively large number of coupons are dispensed in a short period of time. Upon detecting such a series of dispensing transactions, CPU 550 sends a signal to printer 519 to print a report on paper 517. To identify the store in which these transactions occurred, CPU 550 prints a store identification on paper 517 by translating the dispensing unit ID 135 into a store ID, using unit ID-store ID map 523.

Periodically, audit center 500 receives dispensing data from store 305, via modem 512 and telephone signal path 320. Similar to the audit card signal 130 received via the portable audit cards, the dispensing data received via modem 512 includes the identification of a dispensing unit within store 305, coupon data, and a list of dispensing transactions.

Figure 3A:
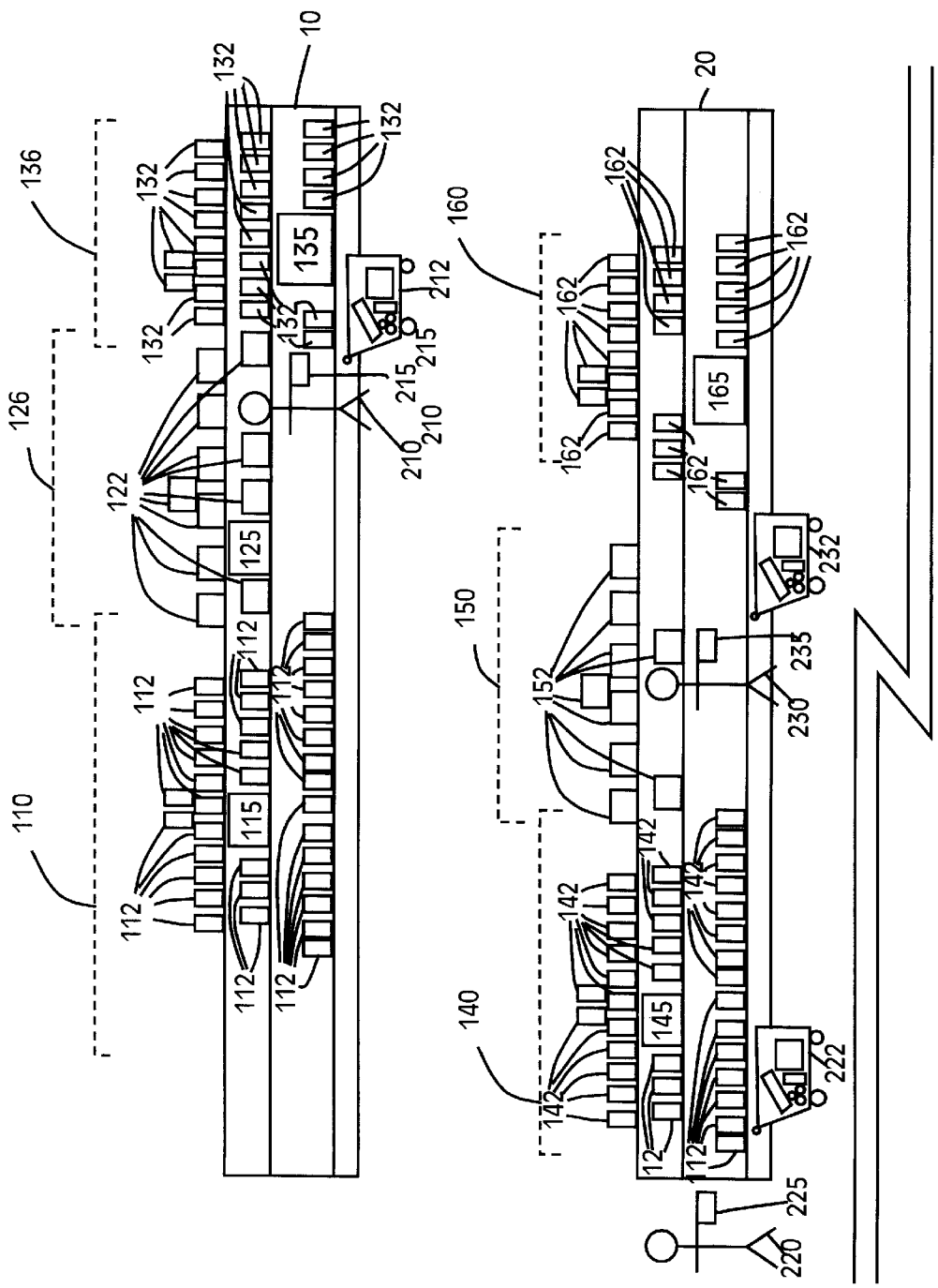
FIGS. 3A and 3B are a schematic diagram emphasizing another portion of the system shown in FIG. 1.
Figure 3B:
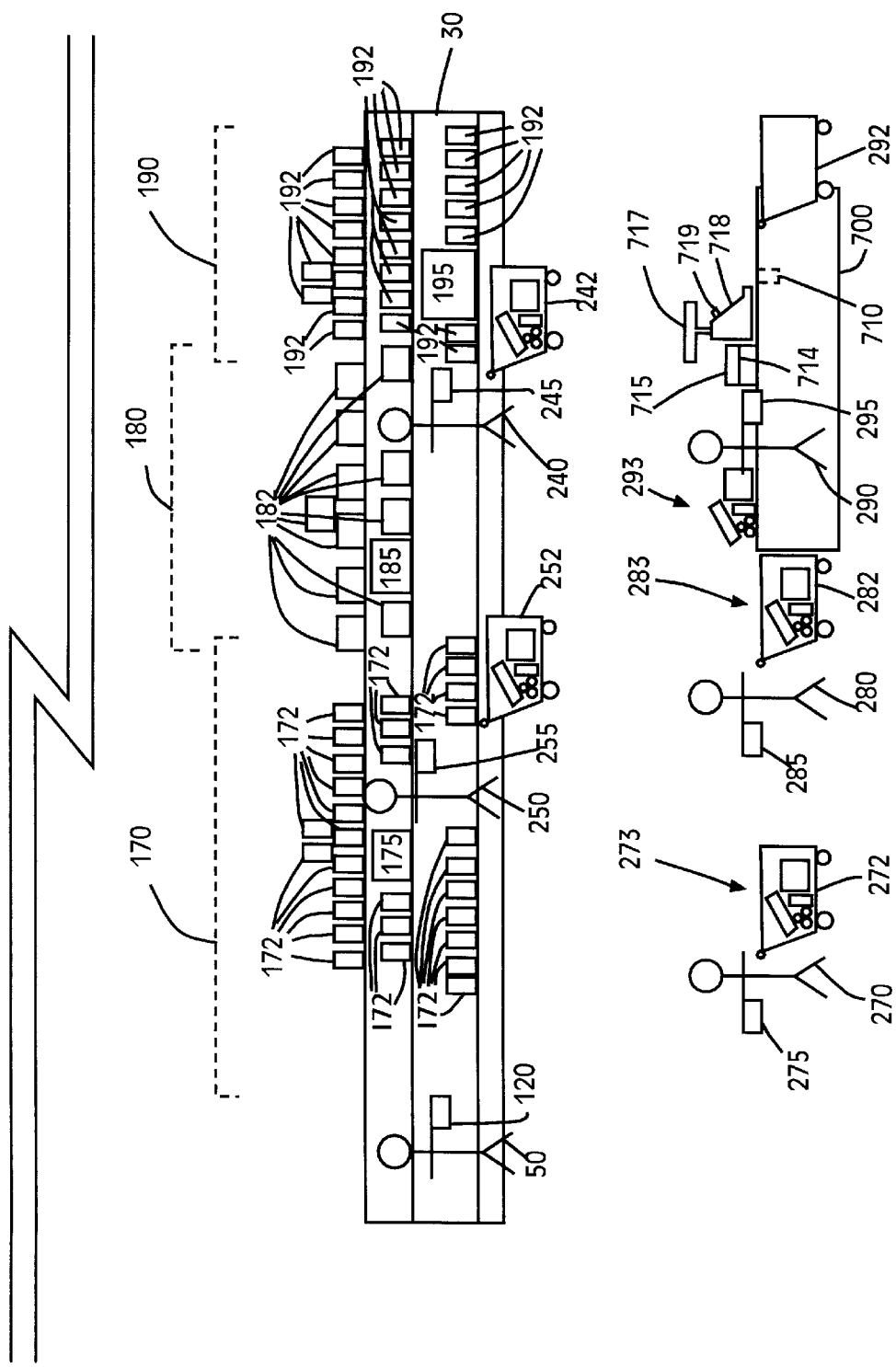

FIGS. 3A and 3B show store 105. FIGS. 3A and FIG. 3B are each a partial view of store 105. Customers 210, 220, 230, 240, 250, 270, 280, and 290, shop in store 105. Before shopping in the store, each of these customers obtained a portable customer card. For example, customer 230 may have obtained customer card 235 from store 105 or from a bank, by completing an application. The application contained questions to collect demographic data, including birth date, income level, past buying patterns, geographic location, size of family, level of education, and job-related data. The card-issuer subsequently wrote customer identification data for customer 230 onto customer card 235, and issued customer card 235 to customer 230, and sent the customer's demographic data to a clearinghouse which then stored the demographic data on disk. Each of customers 210, 220, 240, 250, 270, 280, and 290 obtains a respective customer card in a similar manner.

To create an electronic coupon, a customer inserts her card into a coupon dispensing unit, such as unit 115, adjacent to a product, such as bottles of ammonia 112. The dispensing unit then writes an electronic coupon onto the card. The customer then removes the product from the shelf and places the removed product into her cart. The customer thus shops throughout the store collecting electronic coupons and products. Upon completion of shopping, the customer brings the removed products to checkout counter 700. The customer redeems the electronic coupons at the checkout area, by inserting her customer card into checkout station 715.

In FIG. 3B, service worker 50 carries auditing card 120 for collecting dispensing data from a dispensing unit. Worker 50 inserts card 120 into one of the dispensing units to collect dispensing data from the dispensing unit. Subsequently, store personnel mail card 120 to auditing center 500.

Detailed Hardware Description

Store 105 includes shelves 10, 20, and 30, defining aisles between the shelves. Store 105 has a plurality of product areas, each corresponding to a respective product. Product Area 110 has Acme brand ammonia. Product Area 126 has Delta brand dish detergent. Product Area 136 has Lighthouse brand light bulbs.

Some of the product areas have a respective dispensing unit for depositing coupons onto a customer card, described in more detail below. Product Area 110 has dispensing unit 115, product Area 126 has dispensing unit 125, product Area 136 has dispensing unit 135, product Area 140 has dispensing unit 145, product Area 160 has dispensing unit 165, product Area 170 has dispensing unit 175, product Area 180 has dispensing unit 185, and product Area 190 has dispensing unit 195.

Figure 4A:
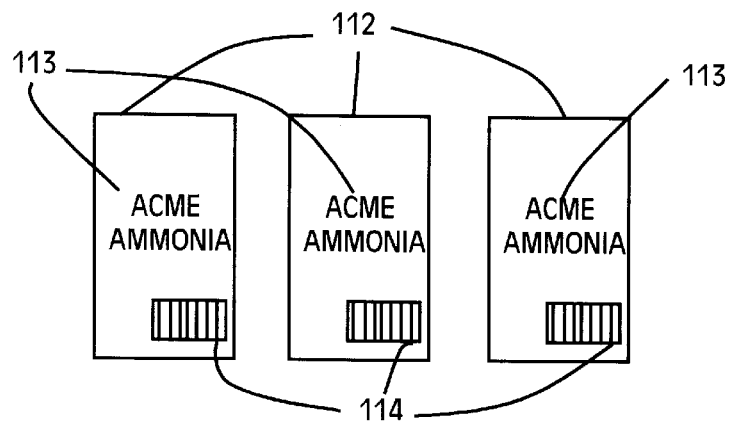
FIGS. 4A, 4B, and 4C are enlarged views of some of the products shown in FIGS. 3A and 3B.

Product area 110 has bottles of ammonia 112 contiguously grouped together on multiple shelves. Bottles of ammonia 112 are contiguously grouped, meaning that no other product is between any two bottles of ammonia 112. FIG. 4A shows an enlarged view of some of the bottles of ammonia 112. Each bottle of ammonia has a common Universal Product Code (UPC) symbol 114. Symbol 114 encodes a 12-digit number that is part of a product identification system documented by the Uniform Code Council, Inc., Dayton, Ohio. In UPC Product Code format, the first digit is a 0, designating a product. The next five digits are a manufacturer ID. The next 5 digits are an item number. The last digit is a check digit.

Each UPC symbol 114 is a group of parallel lines that encodes a number (0 17075 00003 3) that uniquely identifies acme ammonia. In other words, symbol 114 is different from UPC symbols of units of other products. Each bottle of ammonia 112 also has a common character label 113 that verbally describes the product. Character label 113 is "ACME AMMONIA." Label 113 is different from labels of units of other products.

Figure 4B:
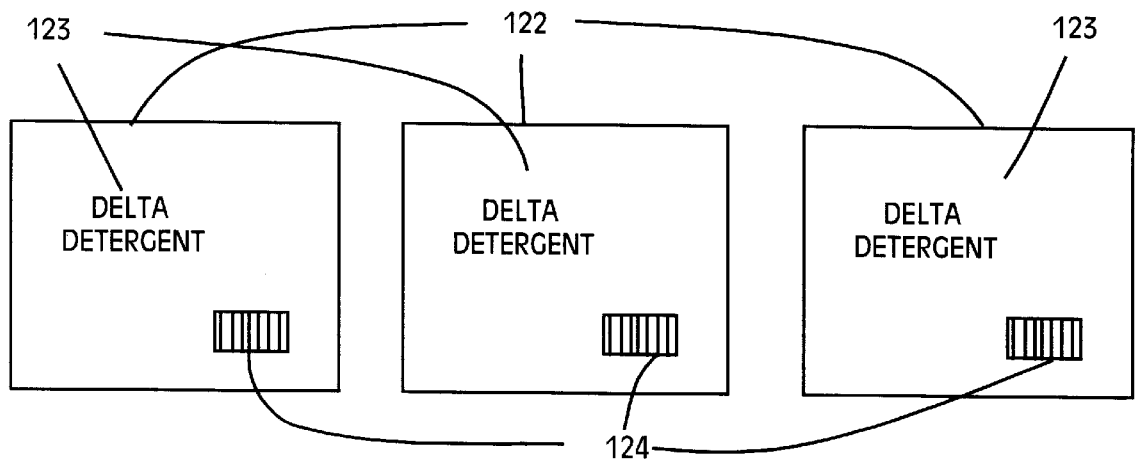

Product Area 126 has boxes of pasta 122 contiguously grouped together on multiple shelves. FIG. 4B shows an enlarged view of some of the boxes of pasta 122. Each box of pasta 122 has a common UPC symbol 124, which is a group of parallel lines that encodes a number (0 17031 00005 3) that uniquely identifies Old World pasta. In other words, symbol 124 is different from UPC symbols of units of other products. Each box of pasta 122 also has a common character label 123 that verbally describes the product. Character label 123 is "OLD WORLD PASTA." Label 123 is different from labels of units of other products.

Figure 4C:
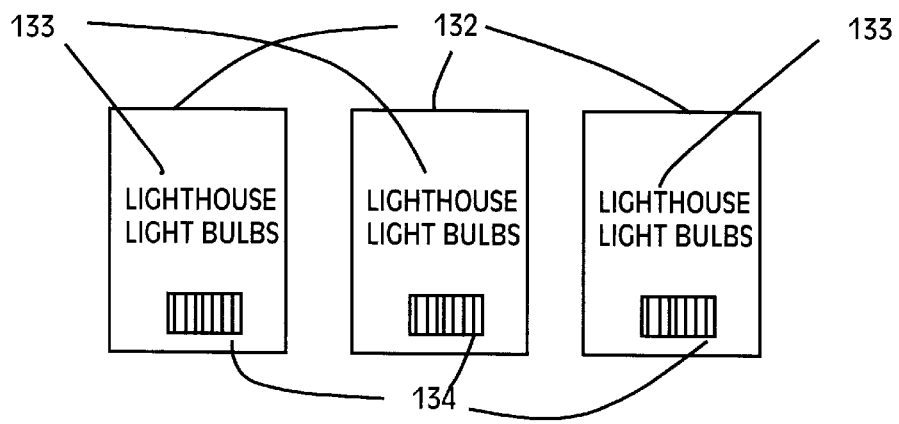

Product Area 136 has boxes of light bulbs 132 grouped together on multiple shelves. FIG. 4C shows an enlarged view of some of the boxes of light bulbs 132. Each box of light bulbs 132 has a common UPC symbol 134, which is a group of parallel lines that encode a number (0 17054 1017 6) that uniquely identifies Lighthouse light bulbs. In other words, symbol 134 is different from UPC symbols of other products. Each box 132 also has a common character label 133 that verbally describes the product. Character label 133 is "LIGHTHOUSE LIGHT BULBS." Label 133 is different from labels of other products.

Similarly, other product areas in store 105 each have a set of respective products contiguously grouped together. Respective units of a certain product have a common UPC symbol, different from UPC symbols on units of other products, that uniquely identifies the certain product. Respective units of a certain product have a common label, different from labels on units of other products, that uniquely identifies the certain product. Product area 140 has bottles of ketchup 142 contiguously grouped together. Product area 160 has loaves of bread 162 contiguously grouped together. Product area 170 has cartons of milk 172 contiguously grouped together. Product area 180 has packages of bacon 182. Product area of 190 has packages of butter 192 contiguously grouped together. Product area 111 has boxes of paper towels contiguously grouped together. Product area 121 has rolls of paper towel contiguously grouped together. Product area 141 has boxes of crackers contiguously grouped together. Product area 151 has canned fruit contiguously grouped together. Product area 161 has canned vegetables contiguously grouped together. Product area 171 has cans of meat contiguously grouped together. Product area 181 has boxes of flour contiguously grouped together.

Figure 5A:
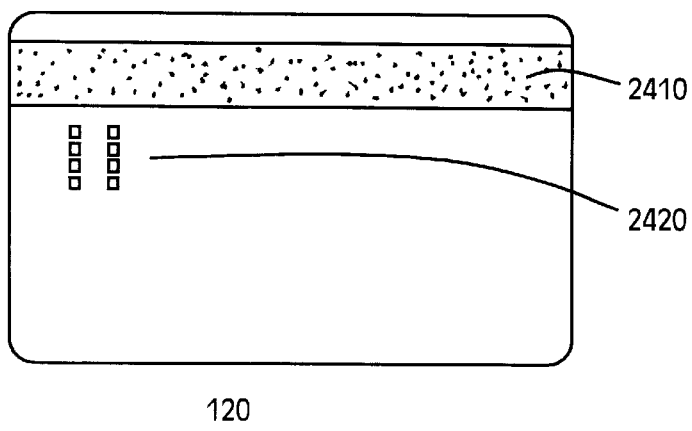
FIG. 5A is a plan view of the audit card in the first preferred system.
Figure 5B:
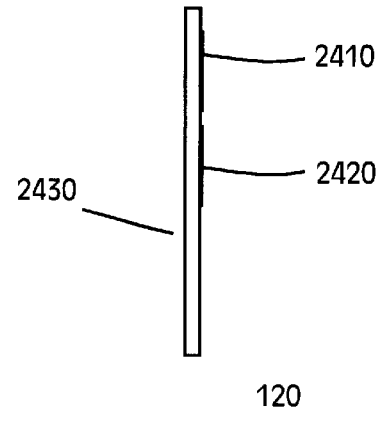
FIG. 5B is a side view of the card shown in FIG. 5A.

FIG. 5A shows a plan view of audit card 120 carried by service worker 50, and FIG. 5B shows a side view of card 120'. Card 120 is 8.5 cm by 5.4 cm, the length and width of a typical financial credit card. Card 120 is slightly thicker than a typical financial credit card. Card 120 includes a magnetic stripe 2410, interface contacts 2420 for communication with the dispensing units and the checkout station, and embossed area 2430 for displaying human-readable data. Magnetic stripe 2410 allows a conventional credit card stripe reader to read basic data from the card. Magnetic stripe 2410 is not necessary to the operation of the preferred embodiments of the invention, described in more detail below.

Figure 5C:
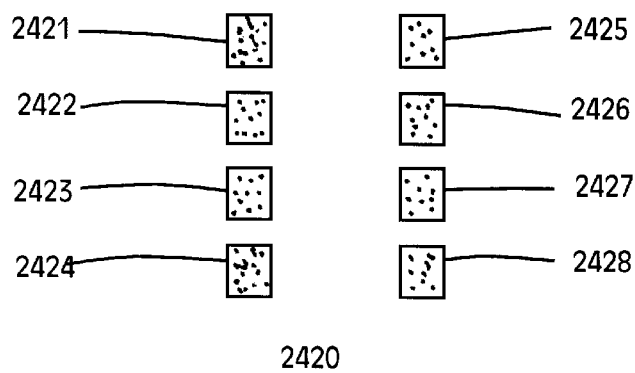
FIG. 5C is an enlarged, partial view of the card shown in FIG. 5A.

FIG. 5C shows interface contacts 2420 in more detail. Interface contacts 2420 are configured in accordance with ISO7816-2: 1988(E), Identification cards—Integrated circuit(s) cards with contact—Part 2: Dimensions and locations of the contacts, promulgated by the International Organization for Standardization (ISO), and available from the American National Standards Institute (ANSI), 11 West 42nd Street, New York, N.Y. 10036. According to ISO 7816-2, contact 2421 is assigned to VCC (supply voltage), contact 2422 is assigned to RST (reset signal), contact 2423 is assigned to CLK (clock signal), contact 2424 is reserved for future use, contact 2425 is assigned to GND (ground), contact 2426 is assigned to VPP (program and voltage), contact 2427 is assigned to I/O (data input/output), and contact 2428 is reserved for future use. Card 120 communicates with the dispensing units and the checkout stations through contact 2427 using a half duplex scheme, meaning that contact 2427 is for communicating data signals either to or from the card.

Figure 6:
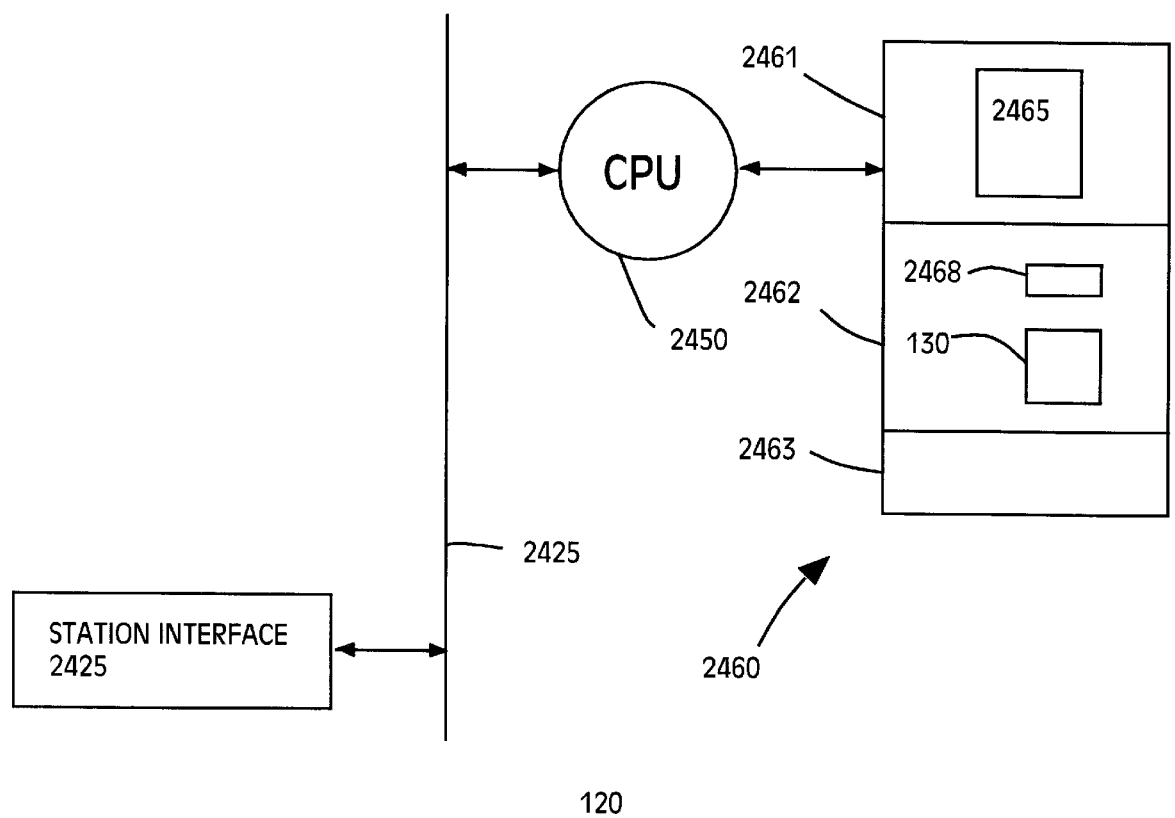
FIG. 6 is a block diagram of the audit card.

FIG. 6 is a block diagram of audit card 120, including central processing unit 2450, processor 2450, and memory 2460. Random access memory 2460, includes three addressable segments: nonvolatile read only memory (ROM) 2461; nonvolatile, electrically erasable memory (EEPROM) 2462; and memory 2463 for temporary storage. Station interface 2425 includes a serial to parallel converter for transferring data signals between contact 2427 and CPU 2450 over parallel bus 2452. ROM 2461 stores a program 2465 executed by processor 2450. EEPROM 2462 stores authorization data 2468. Authorization data 2468 contains a field identifying that the card is an audit card (rather than a customer card). EEPROM 2462 also stores an audit card signal 130, encoding data received from one of the dispensing units (see FIG. 2).

Figure 7:
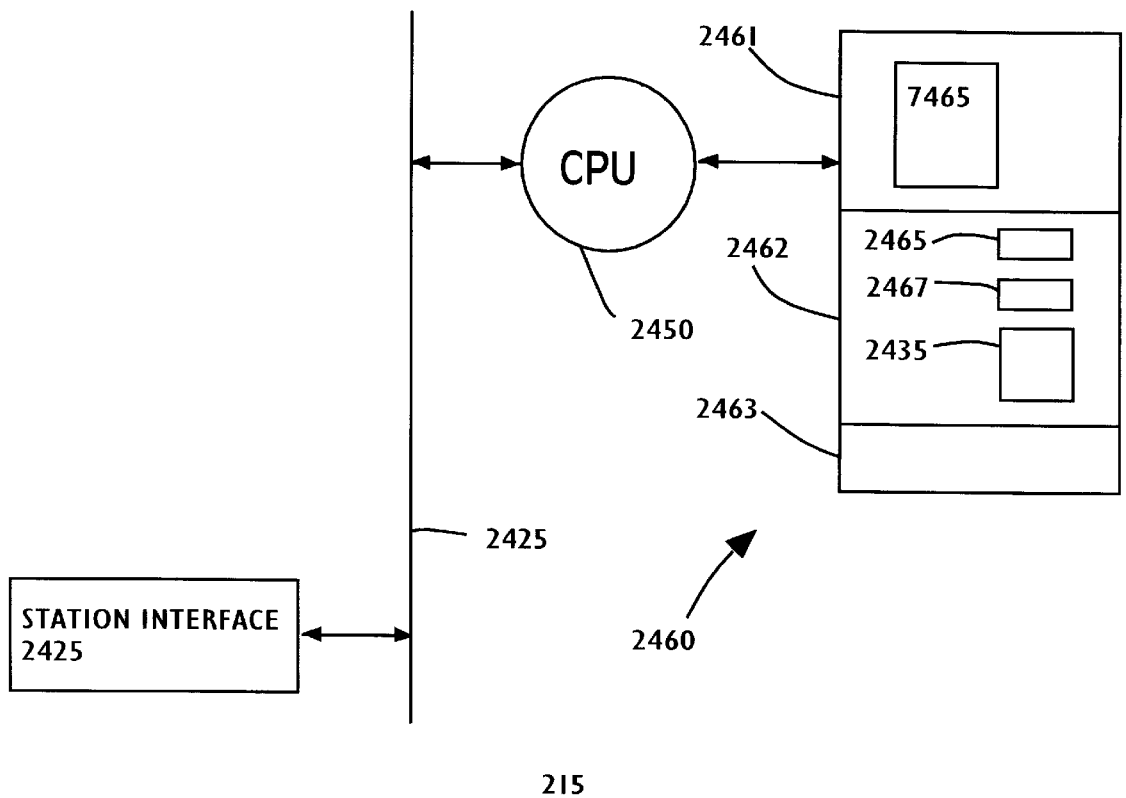
FIG. 7 is a block diagram of one of the customer cards.

FIG. 7 is a block diagram of customer card 215 in which elements corresponding to audit card 120 are labeled with corresponding reference numbers. Customer card 215 has the same exterior structure as that of the audit card 120 described above in connection with FIGS. 5A–5C. Customer card 215 also has the same hardware structure as programming card 120. Random access memory 2460, includes three addressable segments: nonvolatile read only memory (ROM) 2461; nonvolatile, electrically erasable memory (EEPROM) 2462; and memory 8463 for temporary storage. The contents of memory 2460 of customer 215, however, are different from that of memory 2460 of audit card 120. ROM 2461 of card 215 stores a program 7465 executed by processor 2450. EEPROM 2462 stores customer identification data 2467, and authorization data 2465. Customer identification data 2467 includes a sequence of digits that uniquely identifies the holder of the card. Customer identification data 2467 includes the card holder's social security number, thereby uniquely identifying customer 210. Authorization data 2465 includes a sequence of digits that includes a code identifying the store or stores in which the card may be used to obtain a paperless coupon. Authorization data 2465 also includes an expiration date for the card. Depending on the card holder's contractual relationship with the card issuer, the card issuer may periodically update this date data to renew the card when the current date data indicates the card is expired. Store authorization data 2465 also contains a field identifying that the card is a customer card (rather than an audit card, which is described below).

EEPROM 2462 of card 215 also stores a list 2435 of coupons received from one or more of the dispensing units. When a customer inserts a customer card into one of the dispensing units, processor 2450 receives an electronic coupon for the product from the station and adds the code to list 2435.

Each of customer cards 225, 235, 245, 355, 275, and 295 has the same hardware structure as customer card 215.

Figure 8B:
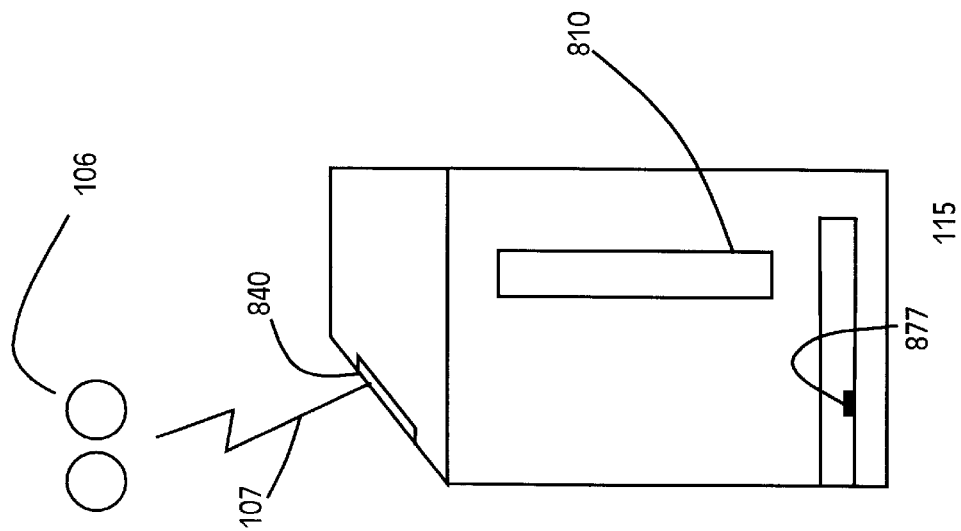
FIGS. 8A and 8B are exterior views of one of the dispensing units for transferring an electronic coupon to the card.
Figure 8A:
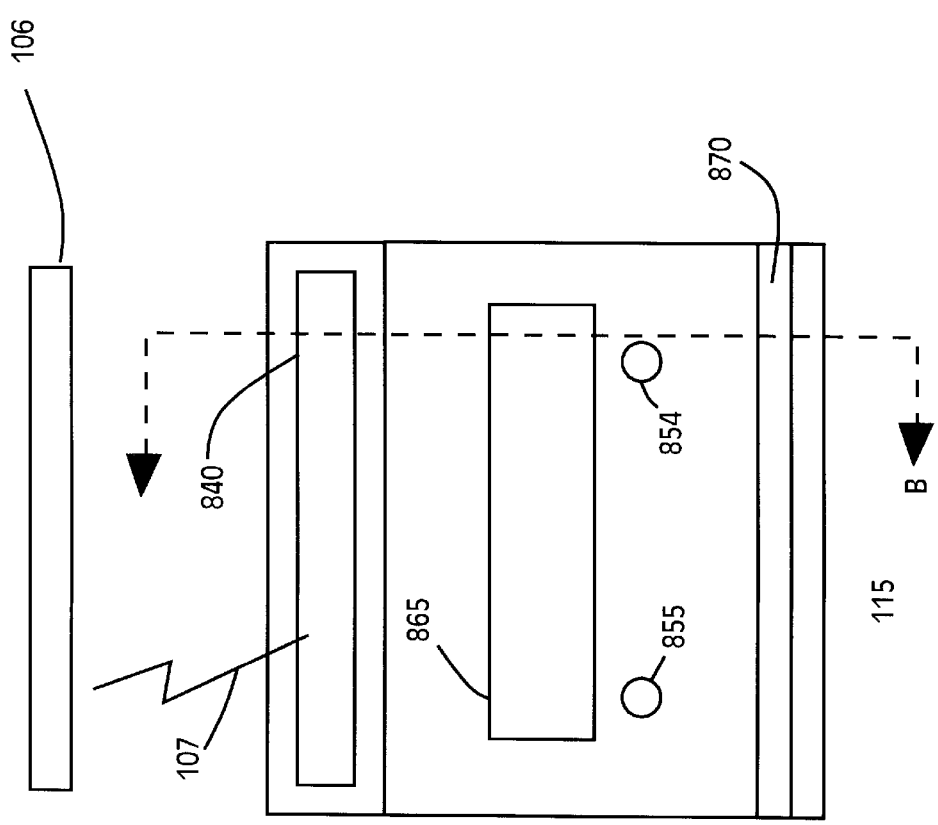

FIG. 8A shows a front view of dispensing unit 115, and FIG. 8B shows a side view of dispensing unit 115 taken along the line B—B in FIG. 8A. Dispensing unit 115 includes green light 855, red light 854, and interface slot 870. Unit 115 also includes liquid crystal display (LCD) 865 for displaying product promotional messages, and a photo-power cell 840 (sometimes called a solar cell) for converting ambient light to electricity for powering dispensing unit 115. Ambient light includes light 107 emitted from ceiling lights 106 mounted in the ceiling of store 105.

Interface slot 870 has a width sufficient to accommodate one of the customer cards or an audit card. When a card is in interface slot 870, conductive contact 877 inside interface slot 870 touches contact 2427 on the card. Interface slot 870 has other contacts (not shown) for touching the other card contacts 2420.

Dispensing unit 115 has no external wires connecting station 115 to another device.

As shown in FIG. 8B, dispensing unit 115 includes a processor and memory inside of control card 810. Control card 810 has an exterior identical to that of the audit card shown in FIGS. 5A–5C.

Figure 9:
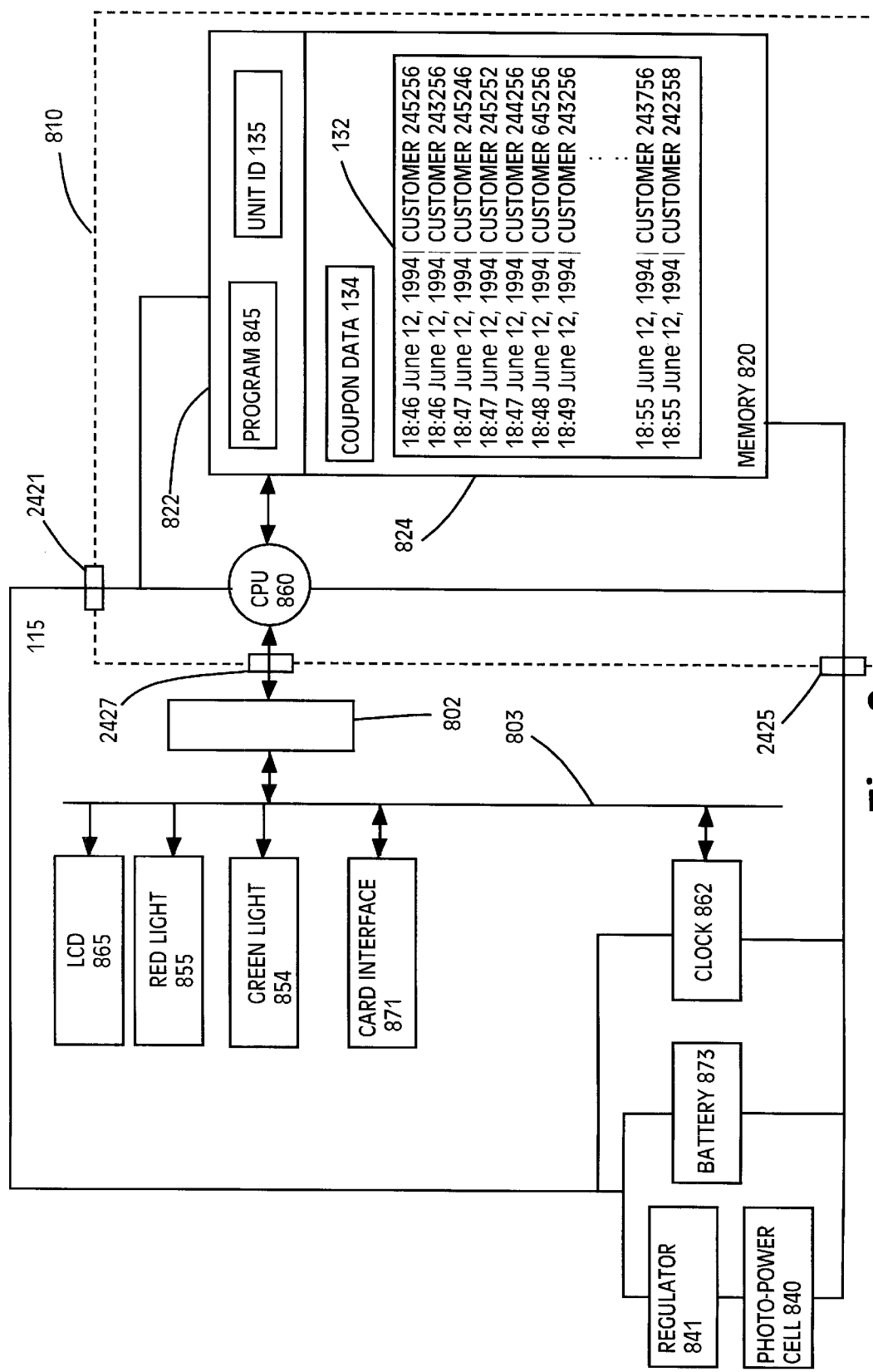
FIG. 9 is a block diagram of the dispensing unit shown in FIGS. 8A and 8B.

FIG. 9 shows a block diagram of dispensing unit 115, including control card 810 having central processing unit 860 and random access memory 820. Memory 820 includes a read only memory (ROM) area 822 for storing a program 845, executed by CPU 860, a respective unit ID 135 that uniquely identifies dispensing unit 115 in the first preferred retail system. Each dispensing unit in the first preferred system has a respective unit ID 135.

Memory 820 also include a read/write memory area 824 for storing coupon data 134 and dispensing transaction list 132.

Control card 810 is electrically coupled to other parts of dispenser 115 via contacts 2420 on control card 810. Card interface circuitry 802 includes a serial to parallel converter allowing CPU 860 to control parallel bus 803 the serial I/O contact 2427.

Dispensing unit 115 also includes clock 862, battery 873, card interface circuitry 871, and photo-power cell 840. Card interface circuitry has a connection (not shown) to battery 873. Card interface circuitry 871 powers a card in interface slot 870, and otherwise sends and receives signals from the contacts in interface slot 870. Photo-power cell 840 is coupled in parallel to battery 873 via voltage regulator 841, to charge battery 873 when sufficient light is received by photo-power cell 840.

Each dispensing unit has the same hardware structure as dispensing unit 115. Each dispensing unit is locked to one of the shelves with a keyed lock.

Figure 10:
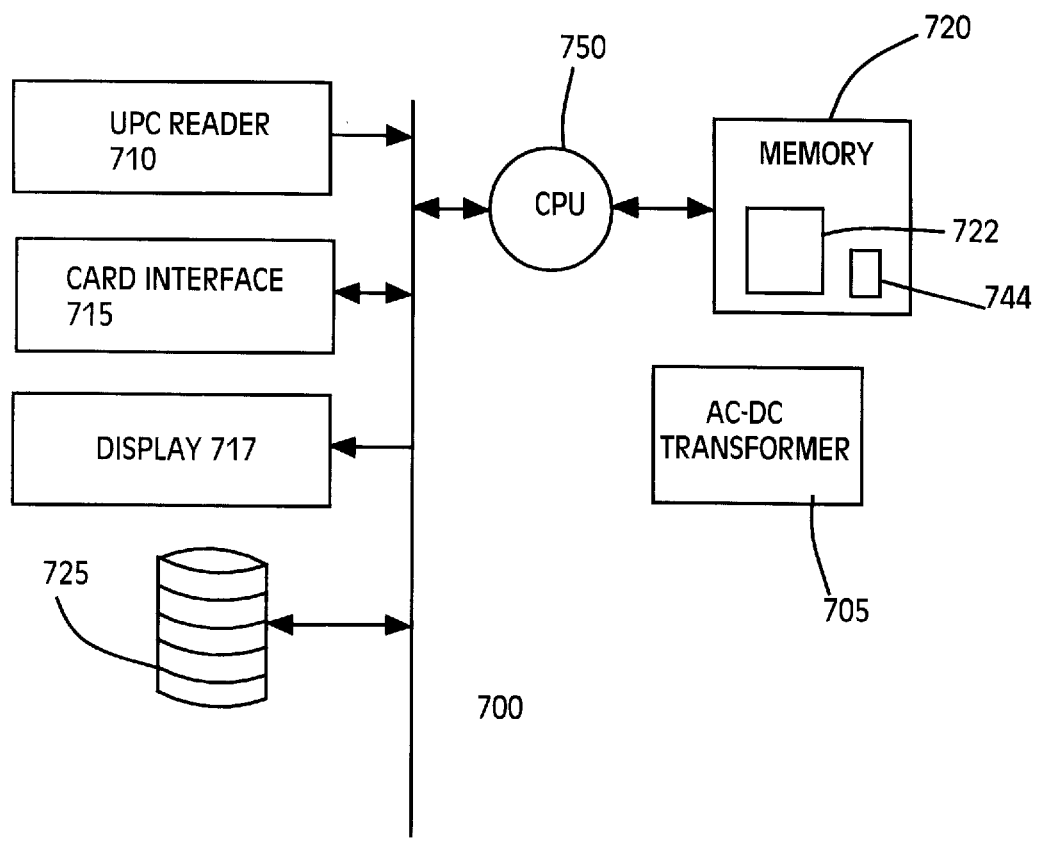
FIG. 10 is a block diagram of the check-out station shown in FIG. 1.

FIG. 10 is a block diagram of checkout counter 700 shown in FIG. 3B. Disk 725 provides long term storage. CPU 750 executes instructions in random access, addressable memory 720. Transformer 705 transforms 60Hz line power into DC power and provides the DC power to CPU 750 memory 720, UPC reader 710, checkout station 715, and other electronics within checkout counter 700. UPC reader 710 detects an optical (electromagnetic) signal reflected from a UPC product symbol.

CPU 750 and program 722 act to detect a product scanned by UPC reader 710, determine a reference price for the product, search for the product's identification in the memory of a customer card, and deduct a discount from the reference price if the product is identified in the customer card memory. CPU 750 then displays the price of the product on display 717. CPU 750 writes coupon redemption data onto disk 725.

Detailed Processing Description of First Preferred Embodiment

Figure 11:
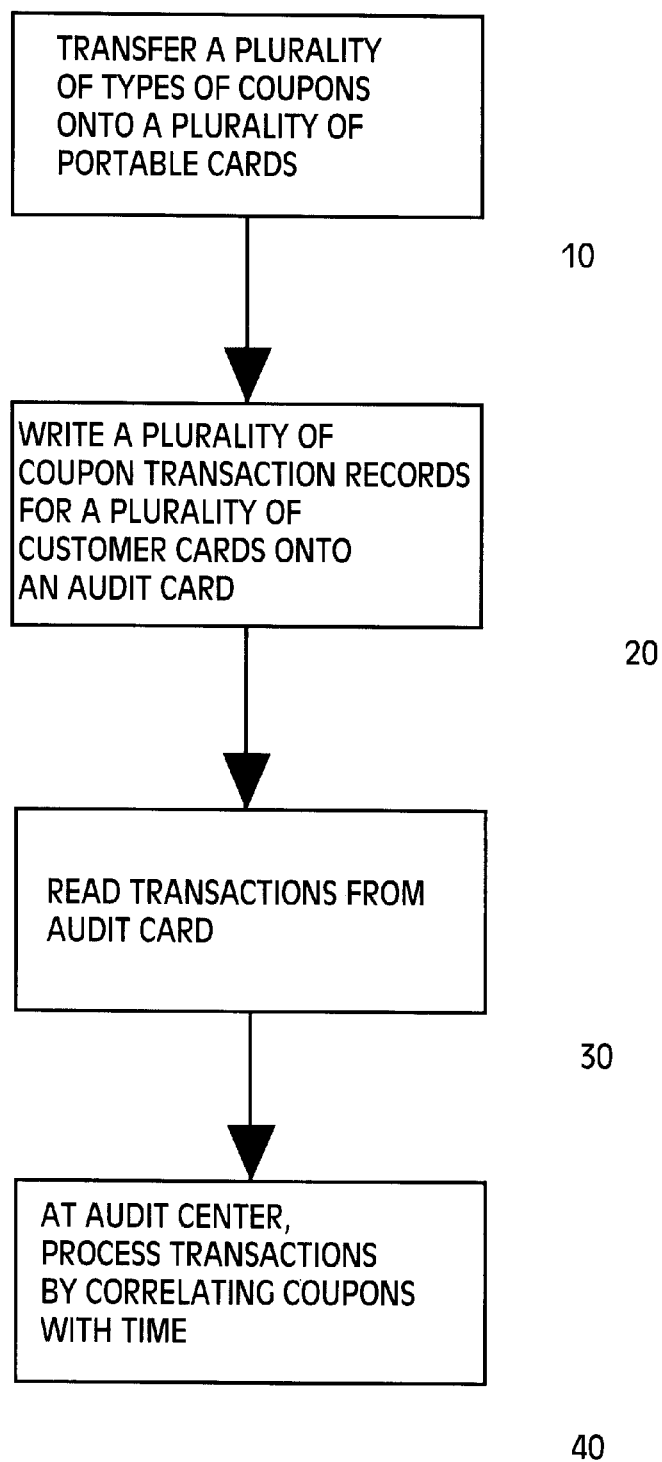
FIG. 11 is a flow chart of a processing performed by the first preferred embodiment of the invention.

FIG. 11 shows a processing performed by the first preferred system. Dispensing unit 115 transfers a plurality of coupons onto a plurality of customer cards and records these coupon transfers in list 132 in memory 820 of FIG. 9. (step 10). After dispensing a plurality of coupons over a period of time, dispensing unit 115 sends list 132 to audit card 120, in response to the insertion of card 120 into unit 115. (step 20). Subsequently, the personnel of store 105 mail audit card 120 to auditing center 500. After auditing center 500 receives card 120, CPU 550 reads audit card signal 130 from card 120 via card reader 570 and stores signal 130 into RAM 520 of FIG. 2. (step 30). Subsequently, CPU 550 determines the number of coupons transferred per unit time, to detect suspicious coupons dispensing patterns. (step 40).

Figure 12:
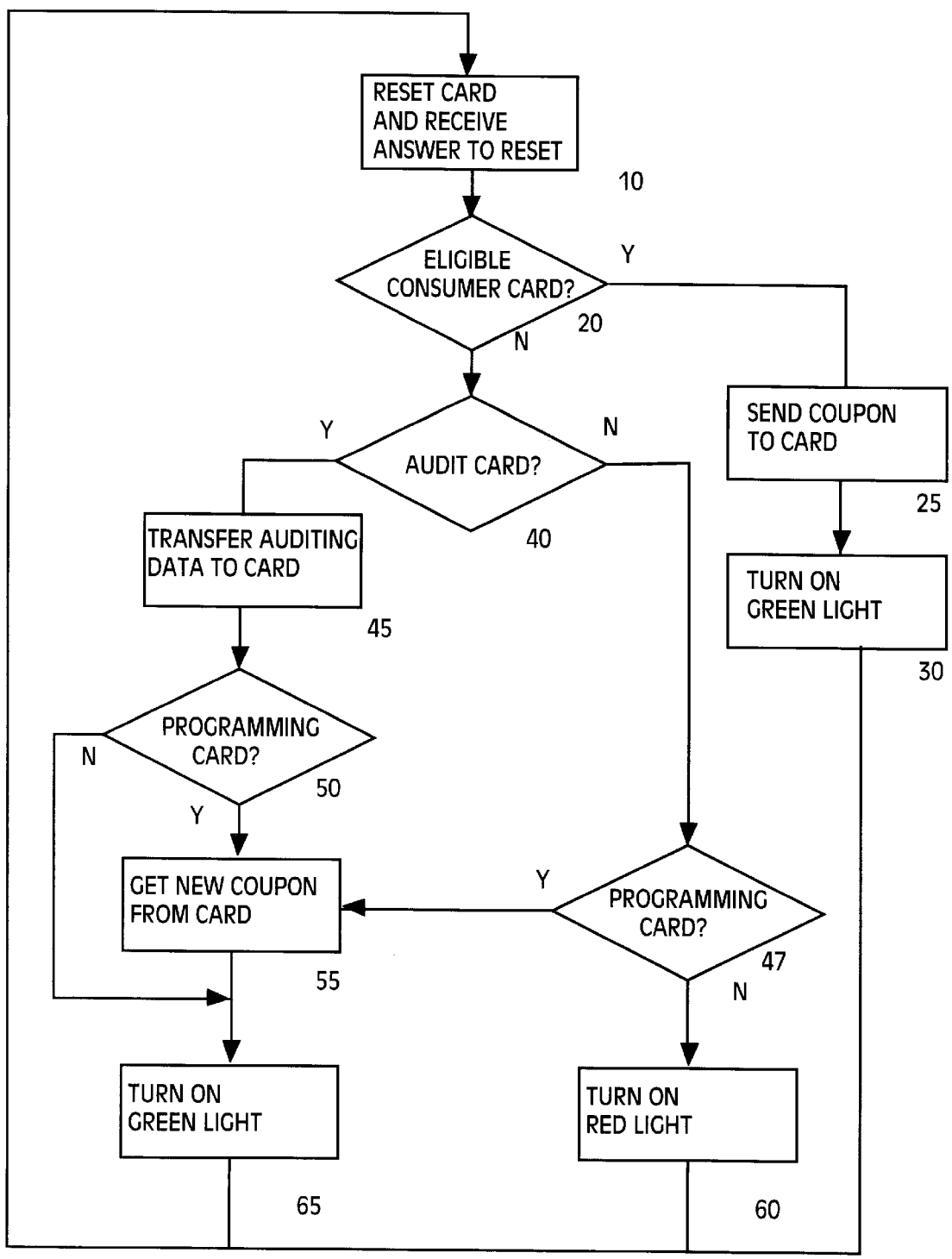
FIG. 12 is a flow chart showing a step of the processing of FIG. 11 in more detail.

FIG. 12 shows a processing performed by processor 860 and program 845 in dispensing unit 115 to effect steps 10 and 20 of FIG. 11. When a customer card is in interface slot 870, conductive contacts (not shown) inside interface slot 870 touch each card contact 2420, thereby applying power from the interface to the card. A switch (not shown) in interface slot 870 alerts processor 860 that a card has been inserted into the slot. Subsequently, processor 860 causes card interface circuitry 871 to reset the card by applying a clock signal to contact 2423 of the card in interface slot 870, via the contacts in interface slot 870. (If the card is a customer card, the card then answers the reset by sending a block of data, including identification data 2467 and authorization data 2465, through card contact 2427. Authorization data 2465 contains a card-type code indicating a customer card. If the card is an audit card, the card send then answers the reset by sending a data block, including authorization data 2468, through card contact 2427. Authorization data 2468 has a card-type code indicating an audit card.) Processor 860 then receives then receives the answer-to-reset data block from the card. (step 10).

The communication protocol between dispensing unit 115 and a customer card or an audit card is described in more detail in ISO/IEC 7816-3: 1989 (E), identification cards—Integrated circuit(s) cards with contacts—Part 3: Electronic signals and transmission protocols; and ISO/IEC 7816-3: 1989/Amd.1: 1992 (E), Part 3: Electronic signals and transmission protocols, AMENDMENT 1: Protocol type T=1, asynchronous half duplex block transmission protocol. Both of these standards are promulgated by the International Organization for Standardization (ISO) and distributed by the American National Standards Institute (ANSI).

Processor 860 analyzes the authorization data in the received answer-to-reset block to determine whether the card is a customer card that is eligible to receive paperless coupons in store 105 (step 20). Processor 860 determines that the card is a customer card if the received authorization data contains a card-type code indicating a customer card. If the card is a customer card, meaning that the authorization data is authorization data 2465, processor 860 determines if the card is eligible to receive paperless coupons in store 105 if authorization data 2465 contains a store code indicating store 105, and the current time and date (as indicated by a date-time clock 862) is not later than the date data in authorization data 2465. If the card is an eligible customer card, processor 860 sends a discount coupon for bottles of ammonia 112. (step 25). Processor 860 then turns on green light 854 to indicate to the customer that an electronic coupon has successfully been transferred to her customer card (step 30), thereby allowing the customer to verify whether she received a discount coupon before selecting the product.

Processor 860 determines that the card is an audit card if the received authorization data contains a card-type code indicating an audit card. If the card is an auditing card, meaning that the received authorization contains a card-type code indicating an audit card (step 40), processor 860 sends unit ID 135, coupon data 134, and transaction list 132 to the card. (step 45).

Another type of card is a programming card that changes the coupon dispensed by a dispensing unit. A portable card may be both an auditing card and a programming card. Thus, step 50 determines whether the audit card is also a programming card. If the card is a programming card as well as an auditing card, meaning that the received authorization contains a card-type code indicating both auditing card and a programming card (step 50), processor 860 gets a new coupon from the card and writes the new coupon into the location for coupon data 134 in memory 820. (step 55). Processor 860 then turns on green light 854 to indicate to the service worker that an auditing and/or programming operation has been successfully performed. (step 65).

If the card is not an auditing card (step 40) and is a programming card (step 47), processor 860 also performs the processing of steps 55 and 65.

If the card is neither an eligible consumer card (step 20), an auditing card (step 40), nor a programming card (step 47), processor 860 turns on the red light to indicate that no transaction was successfully performed with the inserted card. (step 60).

In summary, dispensing unit 115 (one of a plurality of card interfaces) includes electrical contact 877. Dispensing unit 115 reads identification data 2467 (a first signal) from customer card 215. Dispensing unit 115 reads this first signal through contact 877. Dispensing unit 115 sends a coupon signal (a second signal) through contact 877 to the customer card. Subsequently, dispensing unit 115 sends a third signal, associating the first and second signals, to an audit card 120. Dispensing unit 115 sends this third signal through contact 877.

Figures 13, 15:
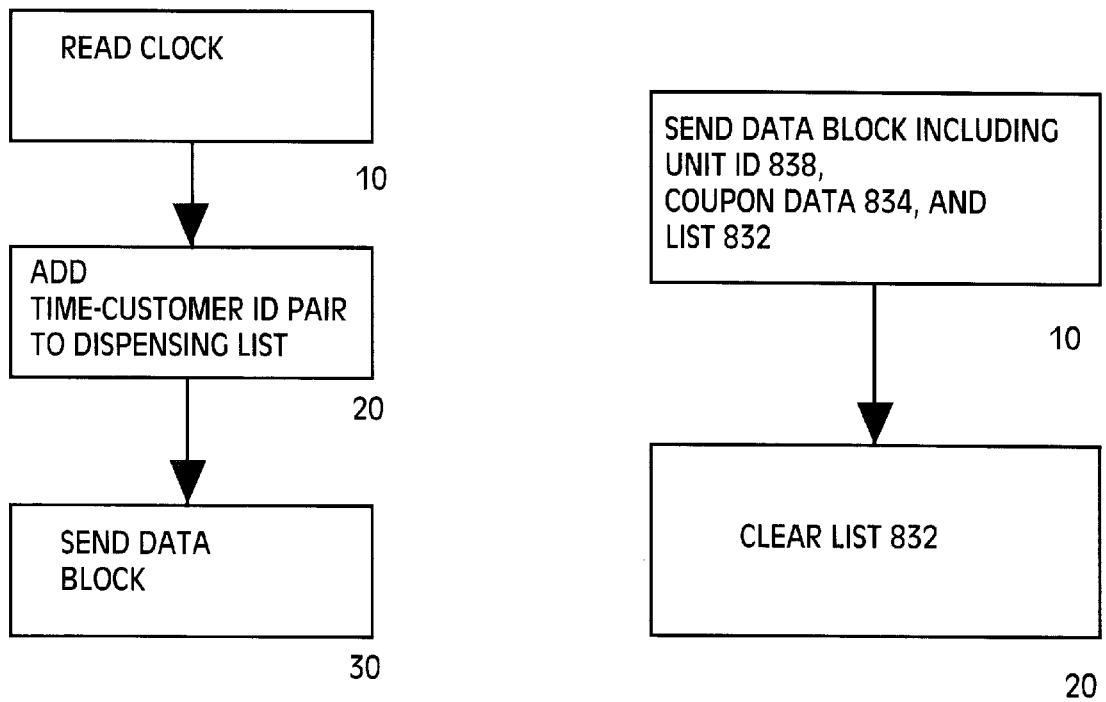
FIG. 13 is another flow chart showing a step of the processing of FIG. 12 in more detail.
FIG. 15 is another flow chart showing a step of the processing of FIG. 12 in more detail.

FIG. 13 shows the processing of step 25 of FIG. 12, sending a coupon to a customer card, in more detail. Processor 860 reads the date-time clock 862 (step 10) and adds an record to dispensing list 132. (step 20). The record includes the read date-time and the customer identification data 2467. Thus, processor 860 reads identification data 2467 (a first signal) from customer card 215, in response to a person presenting card 215 to dispensing unit 115.

Processor 860 then sends to the customer card a data block containing a type code indicating a dispensing unit, and coupon data 134. (step 30). Thus, processor 860 writes coupon data 134 (a second signal) into EEPROM 2462 of card 215, in response to the person presenting card 215 to dispensing unit 115, coupon data 134 corresponding to bottles of ammonia 112 (one of the plurality of products in the first preferred retail system). Dispensing list 132 is essentially a third signal, each record in list 132 associating the first signal with the second signal.

FIG. 14A shows some the contents list 2435, starting at offset 30, in EEPROM 2462 of customer card 215, before processor 860 of the dispensing unit executes step 30 of FIG. 13. Each row of list 2435 shows an electronic coupon in the 12 digit number in UPC Coupon Code format. In this format, the first digit is a 5, designating a coupon. The next five digits are a manufacture ID. The next 3 digits are a family code. The next 2 digits are a value code. The last digit is a check digit. In FIG. 14A, customer card 215 is storing two electronic coupons in list 2435, reflecting the fact that customer 210 has received electronic coupons from coupon dispensing units. After processor 860 executes step 30 of FIG. 13 (thereby sending another electronic coupon to the customer card), CPU 2450 in customer card 215 receives the data and adds the data to list 2435, resulting in three electronic coupons in list 2435 as shown in FIG. 14B.

FIG. 15 shows the processing of step 45 of FIG. 12, transferring auditing data to an auditing card, in more detail. Processor 860 constructs a data block including the unit ID 135, coupon data 134, and dispensing list 132 from memory 820. Processor 860 then sends this data block to the auditing card. (step 10). Processor 860 then clears list 132 by setting a variable LIST_RECORD_COUNT=0 (step 20).

Figure 16:
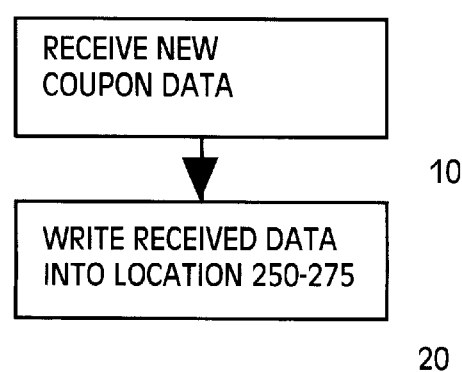
FIG. 16 is another flow chart showing a step of the processing of FIG. 12 in more detail.

FIG. 16 shows the processing of step 55 of FIG. 12 in more detail. Processor 860 receives new data from the card (step 10) and changes coupon data 134 by writing the new data to the location of data 134 in memory 820 (step 20), thereby changing the electronic coupon dispensed by the dispensing unit.

FIG. 17A shows product data coupon data 134 in memory 820 before the execution of step 30 of FIG. 16, and FIG. 17B shows coupon data 134 after step 30. In this example 5 17075 278 30 7 is a coupon for purchase of a bottle of ammonia bottle 112. FIG. 17B shows a coupon for a different product.

Figure 18:
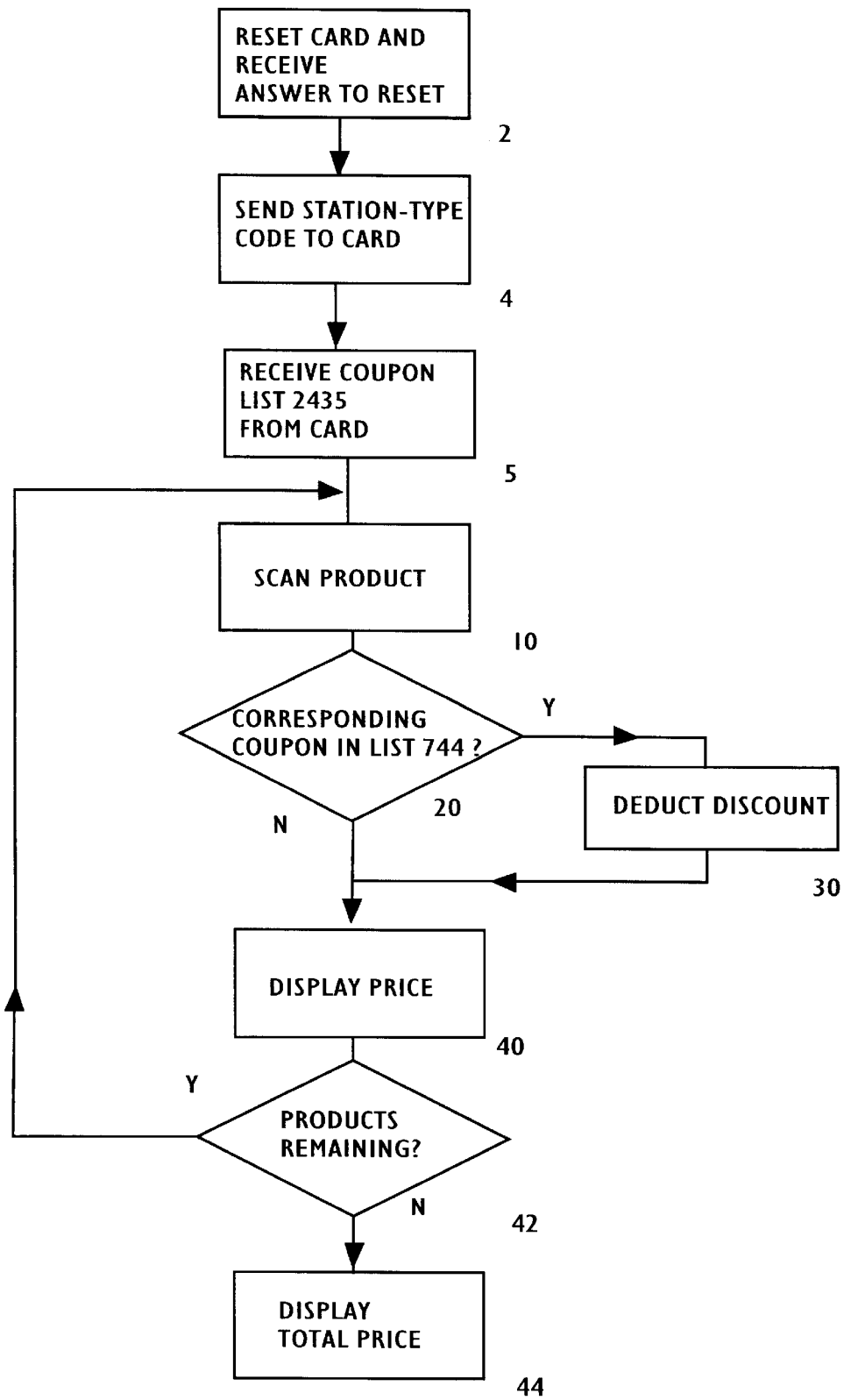
FIG. 18 is a flow chart of a processing performed by the check-out station.

FIG. 18 shows a processing performed by CPU 750 and program 722 in checkout counter 700, when a customer checks out of store 105. Wvhen a customer, such as customer 290, inserts customer card 295 into interface slot 714, a switch (not shown) in interface slot 714 alerts CPU 750 that a card has been inserted into the slot. When a customer card is in interface slot 714, conductive contacts (not shown) inside interface slot 714 touch each card contact 2420, thereby applying power from the interface to the card. Subsequently, CPU 750 causes card interface 725 to reset the card by applying a clock signal to card contact 2423. (If the card is a customer card, the card then answers the reset by sending a block of data, including identification data 2467 and authorization data 2468, through card contact 2427.) CPU 750 then receives the answer-to-reset from the card (step 2). CPU 750 then sends a data block containing a station-type code indicating a checkout station (step 4). CPU 750 then receives the contents of table 2435 in EEPROM 2462 of the customer card, and temporarily stores these table contents in memory 720 of the checkout station (step 5). During step 5, CPU 750 alsp causes customer card 295 to remove all entries from list 2435, so that the electronic coupons in the list cannot be redeemed again. During step 5, CPU 750 also translates the value code of each received UPC coupon code into a discount quantity corresponding to the code. CPU 950 then makes a record including the coupon and the discount amount, and adds this record to a temporary coupon list 744 in memory 720 To perform this translation, CPU 750 may communicate with an in-store central computer that contains tables for translating the value field of UPC coupon codes into a discount quantity.

When the checkout clerk (not shown) moves a product past UPC reader 710, UPC reader 710 detects the UPC code on the product and sends the UPC code to CPU 750 (step 10). CPU 750 determines whether the product scanned has a corresponding coupon in list 744 (step 20). If the product has a corresponding coupon in list 744, CPU 750 deletes the coupon from list 744. In other words, CPU 750 searches list 744 for a corresponding coupon. A product corresponds to a coupon if the five-digit manufacturer ID in the UPC coupon code equals the five-digit manufacturer ID in the UPC coupon code, and the three-digit coupon family code for the product corresponds to the three-digit family code of the coupon. These two family codes correspond if they are equal or if the coupon family code is a summary code that matches certain digits of the product's coupon family code, as described more fully in the UPC Coupon Code Guidelines Manual, reprinted October 1994, from the Uniform Code Council, Inc., Dayton, Ohio.

If the product has a coupon, CPU 750 subtracts the discount, as determined by the discount quantity data stored in list 744, from a product reference price read from disk 725 (step 30), and displays the resulting price of the product on display 717 (step 40).

In summary, card interface 725 (a second interface) receives second signals from the memory of one of the customer cards. CPU 750 receives a UPC product code (a fourth signal) from UPC reader 710, and determines a price depending on whether the fourth signal corresponds to one of the received second signals.

Figure 31:
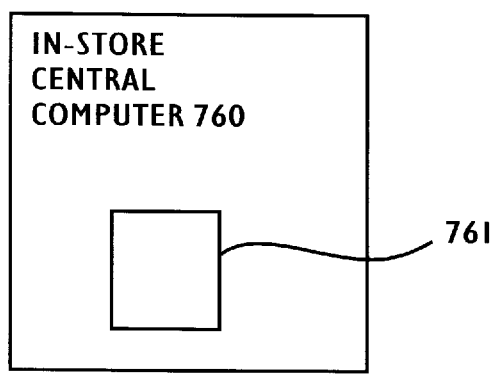
FIG. 31 shows an in-store central computer.

CPU 750 may obtain the 3-digit family code for a product by sending the UPC coupon code to an in-store central computer 760 that contains tables 761 (FIG. 31) for correlating UPC coupon codes with UPC product codes. An in-store central computer for sending product and coupon data to a cash register is described in applicant's copending U.S. Pat. application Ser. No. 08/299,688 of KEN R. POWELL for COMPUTER NETWORK FOR A RETAIL SYSTEM, filed Feb. 11, 1997, the contents of which is herein incorporated by reference.

Figure 19:
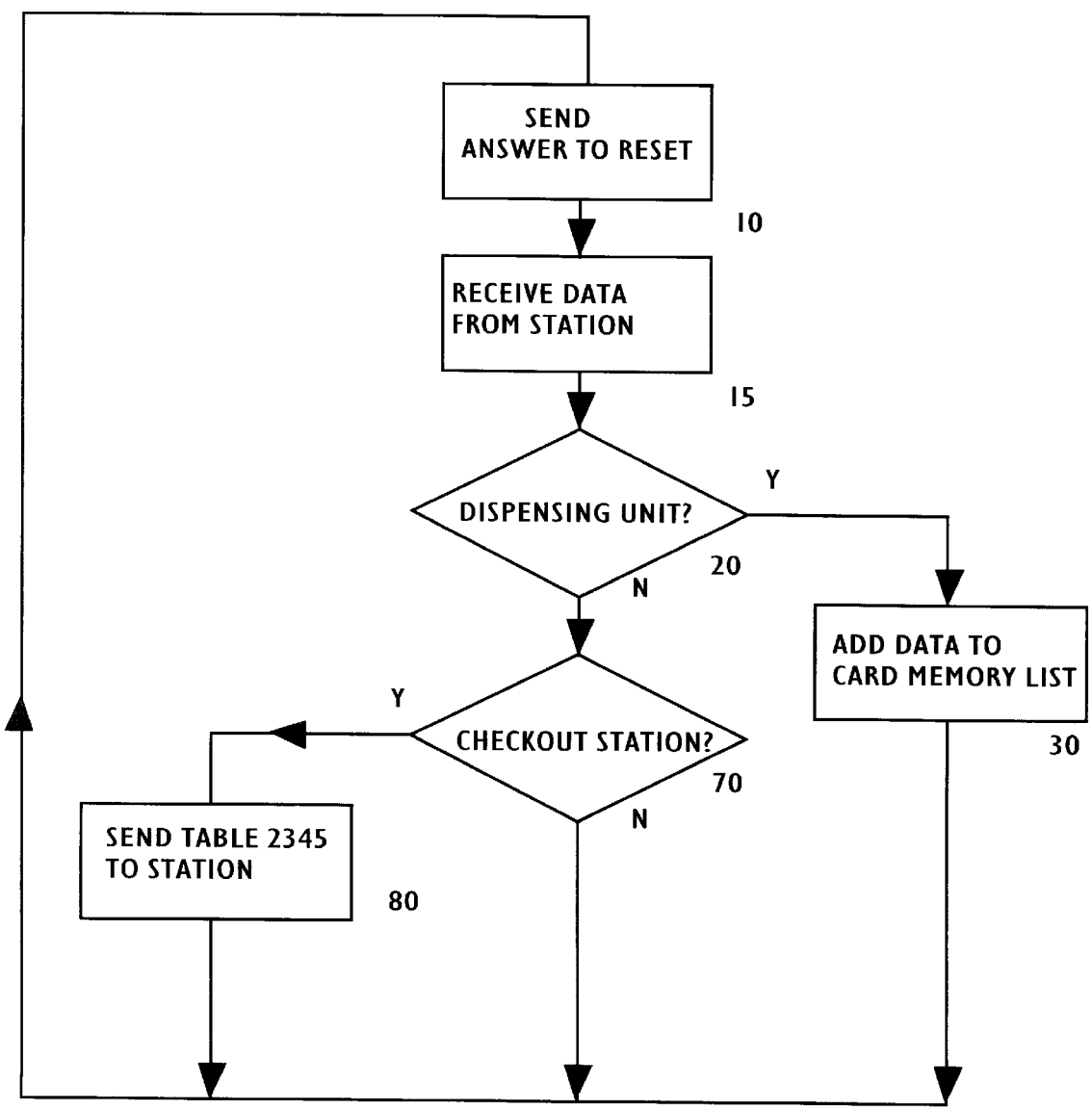
FIG. 19 is a flow chart of a processing performed by one of the customer cards.

FIG. 19 shows a processing performed by one of the customer cards, such as customer card 215, in the first preferred retail system. After the card is reset through contacts 2420, the customer card sends an "answer to reset" data block in accordance with the ISO standard ISO/IEC 7816-3: 1989(E), cited above. The customer card sends identification data 2467 and authorization data 2465 in the answer-to-reset data block (step 10). If the station then sends a block of data to the customer card, the customer card then receives the block of data through contact 2427 (step 15). If the block contains a station-type code indicating a dispensing unit (step 20), the customer card then adds product coupon data, from a certain offset in the block, to the list 2345 (step 30).

If the customer card is not eligible, the station will not send a block of data, step 15 therefore does not execute, and processing ceases until the customer card is reinserted into a station, at which time the station will reset the card and processing will restart at step 10.

Alternatively, if the block contains a station-type code indicating a checkout station (step 70), the customer card then sends list 2345 to the checkout station (step 80). In other words, CPU 2450 reads list 2435 from EEPROM 2462, in response to a customer inserting card 215 into checkout station 715, and sends a signal corresponding to the list 2345 to the checkout station (step 80).

In FIG. 3B, service worker 50 carries auditing card 120 for auditing a dispensing unit. Service worker 50 creates a signal path to one of the dispensing units by inserting auditing card 120 into the interface slot of the dispensing unit. The auditing card then receives a signal, via contact 4177 identifying customers that received coupons from the dispensing unit. Service worker 50 then breaks the signal path by removing auditing card 120.

Figure 20:
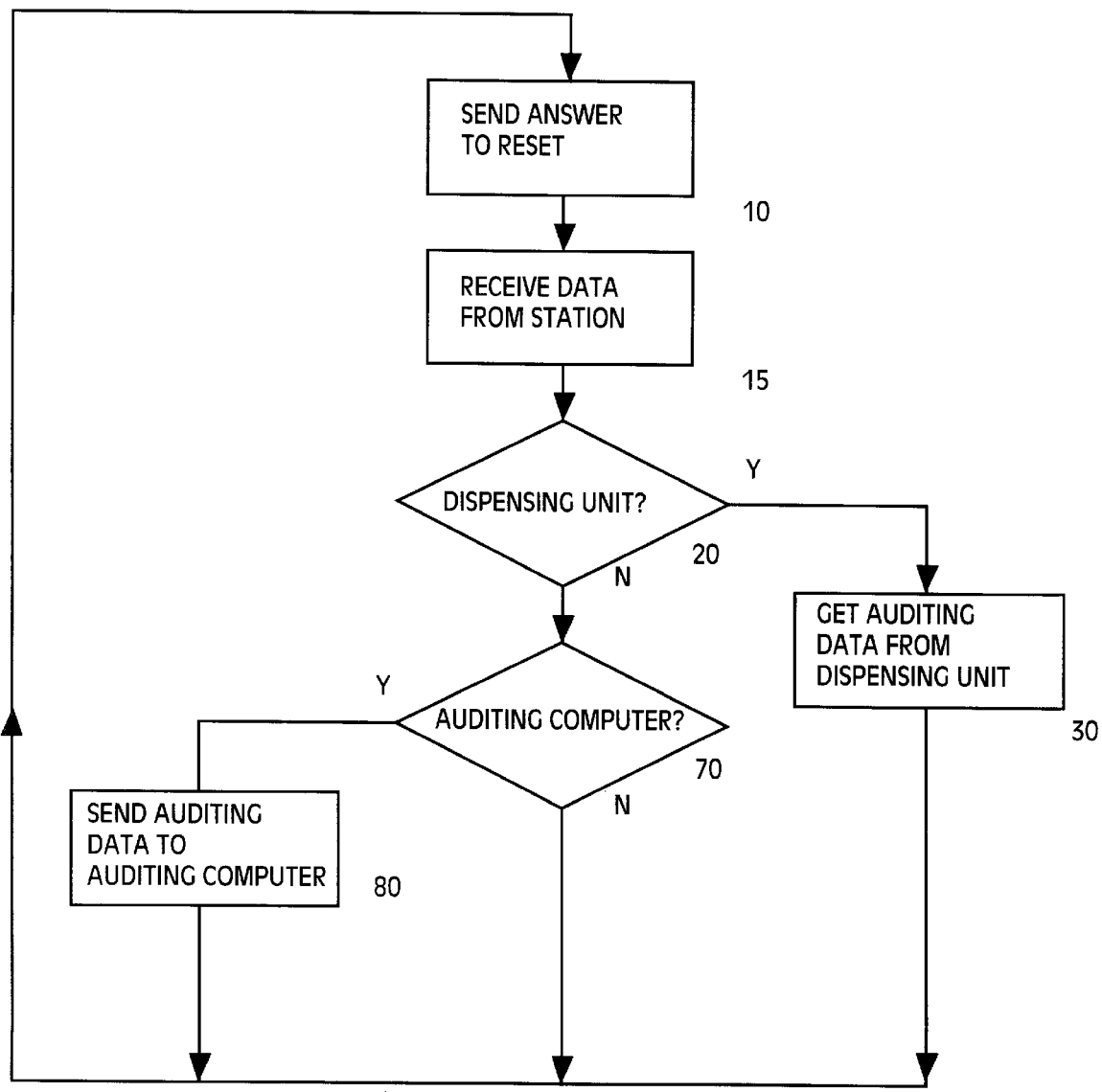
FIG. 20 is a flow chart of a processing performed by the auditing card.

FIG. 20 shows a processing performed by auditing card 120. After the card is reset through contacts 2420, the auditing card sends an "answer to reset" data block in accordance with the ISO standard ISO/IEC 7816-3: 1989 (E), cited above. The auditing card sends authorization data 2468 in the answer-to-reset data block (step 10). The auditing card then receives the block of data through contact 2427 (step 15). If the block contains a station-type code indicating a dispensing unit (step 20), the auditing card then receives the signal including dispensing list 132, identifying customers that received coupons (step 30).

Alternatively, if the block contains a station-type code indicating an auditing computer (step 70), the auditing card then sends the signal, received in step 30, to the auditing computer (step 80).

Figure 21:
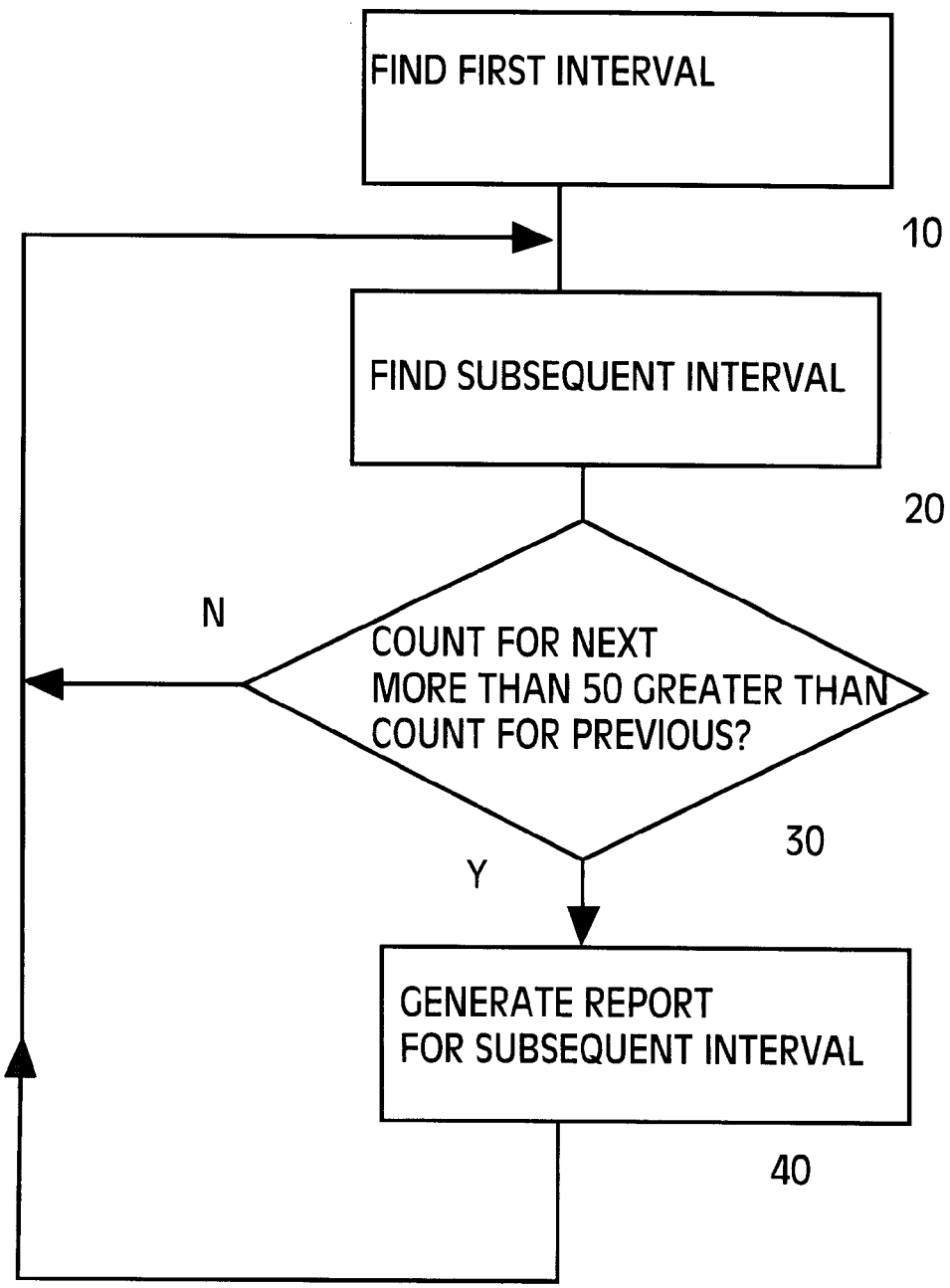
FIG. 21 is a flow chart of a processing performed by the auditing center.

FIG. 21 shows a processing performed by CPU 550 executing program 551 in the auditing center shown in FIG. 2. CPU 550 finds a section of list 132 encompassing a 15 minute interval of coupon dispensing. (step 10). CPU 550 then finds the subsequent 15 minute interval of coupon dispensing. (step 20). CPU 550 determines if the number of coupons dispensed in this subsequent interval exceeds the number of coupons dispensed in the previous interval by 50 coupons. (step 30). If this difference in number of dispensed coupons exceeds 50, CPU 550 generates a report for the subsequent interval. (step 40). CPU 550 then proceeds to step 20 to determine the next subsequent interval of 15 minutes.

FIG. 22 shows a print out on paper 517 of FIG. 2, produced by the processing of step 40 of FIG. 21. The printout of FIG. 22 alerts personnel in the auditing center that a particular dispenser in a particular store dispensed a relatively large number of coupons in a short period of time.

Figure 23:
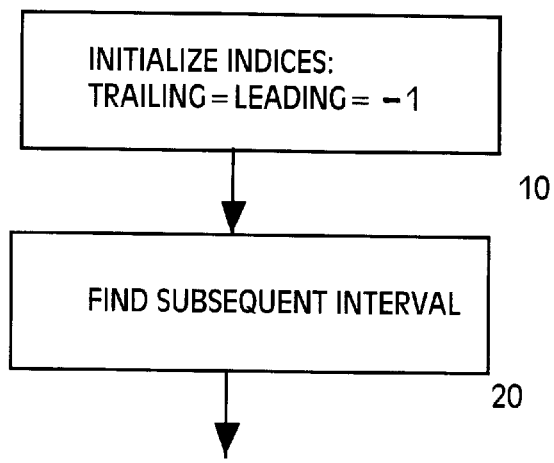
FIG. 23 is flow chart showing a processing of a step of FIG. 21 in more detail.

FIG. 23 shows the processing of step 10 of FIG. 21 in more detail. CPU 550 initializes indices for list 132 of FIG. 2, by performing the variable assignment LEADING= TRAILING=−1. CPU 550 then gets the subsequent interval as determined by the present value of the variables TRAILING and LEADING. (step 20).

Figure 24:
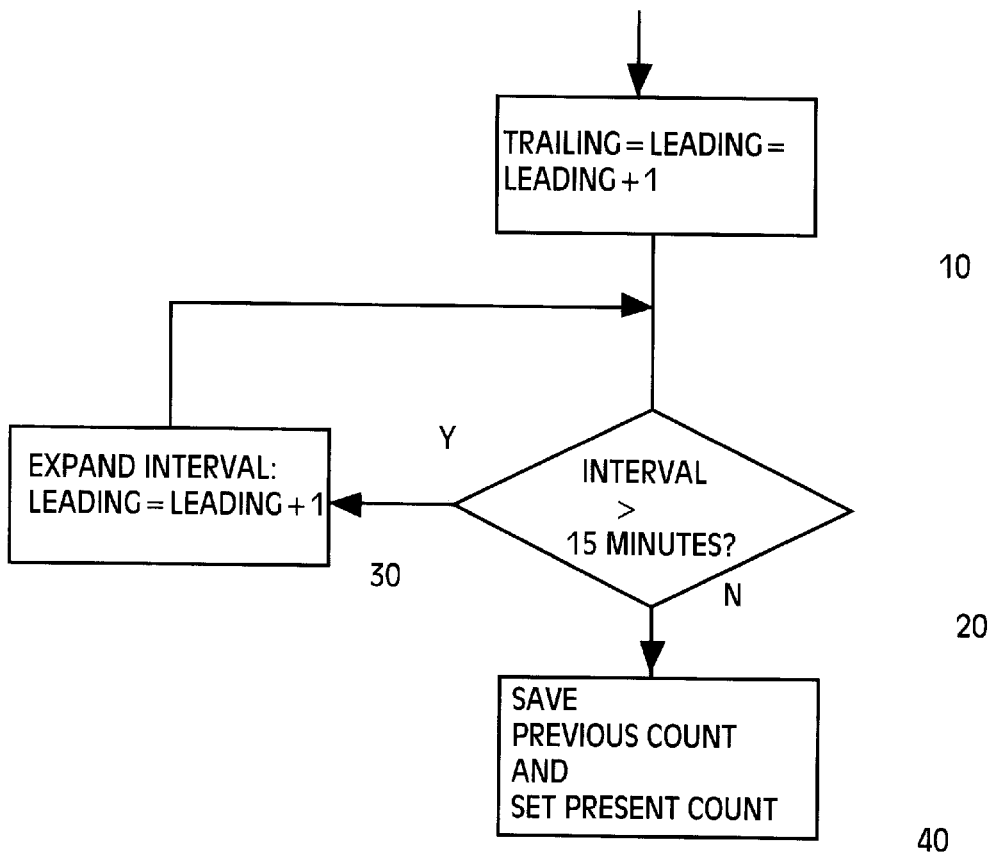
FIG. 24 is another flow chart showing a processing of another step of FIG. 21 in more detail.

FIG. 24 shows the processing of steps 20 in FIGS. 21 and 23 in more detail. To find the beginning of the subsequent interval, CPU 550 performs the variable assignments TRAILING=LEADING=LEADING+1. (step 10). CPU 550 then determines if the difference between the beginning of the interval and the end of the interval is greater than 15 minutes. (step 20); CPU 550 executes the following instruction:

DIFFERENCE (T_ARRAY [TRAILING, TIME], T_ARRAY [LEADING+1, TIME])>15 wherein T_ARRAY is an array of the records in list 132, the first record being accessible using an index of 0. Each record includes a TIME field for storing the date and time at which a coupon was dispensed. Each record also includes a CUSTOMER_ID field for recording the customer to whom the coupon was dispensed. The fanction DIFFERENCE takes two arguments in the date-time format of the records in list 132, and returns the difference in units of minutes.

If the difference is not greater than 15 minutes, CPU 550 expands the interval, by performing the variable assignment LEADING=LEADING+1. (step 30). If the difference is greater than 15 minutes, CPU 550 saves the count of a previously processed interval by performing the variable assignment PREVIOUS_COUNT=PRESENT_COUNT; and sets the coupon count for the currently processed interval by performing the variable assignment PRESENT_COUNT=LEADING—TRAILING+1. (step 40).

Figure 25:
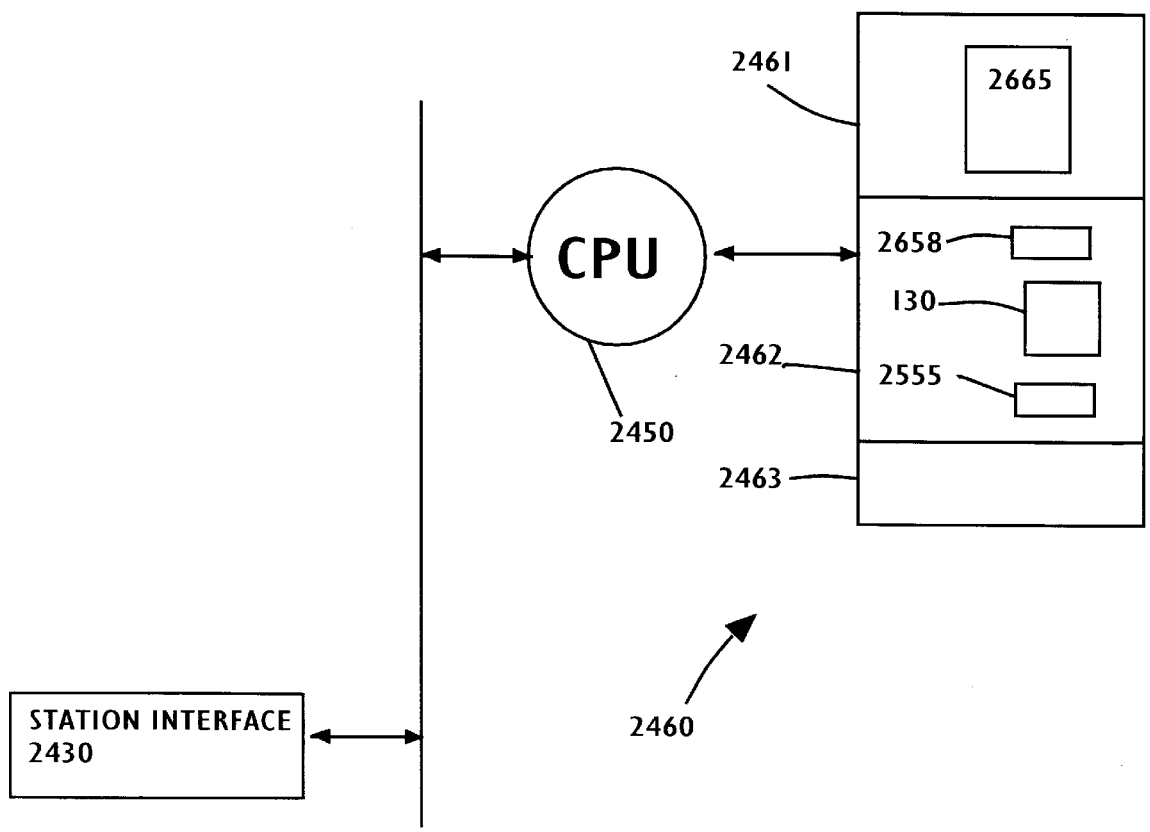
FIG. 25 is a block diagram of an alternative audit card that includes a dispensing unit programming feature.

FIG. 25 shows a block diagram of an auditing/ programming card 65 in accordance with an alternative embodiment of the present invention. Auditing/ programming card 65 is similar to auditing card 120, except that card 65 has program 2665 in ROM 2461; and authorization data 2658, and new discount data 2555 in EEPROM 2462. Authorization data 2658 included a cardtype code indicating that the card is both an auditing card and a programming card.

Figure 26:
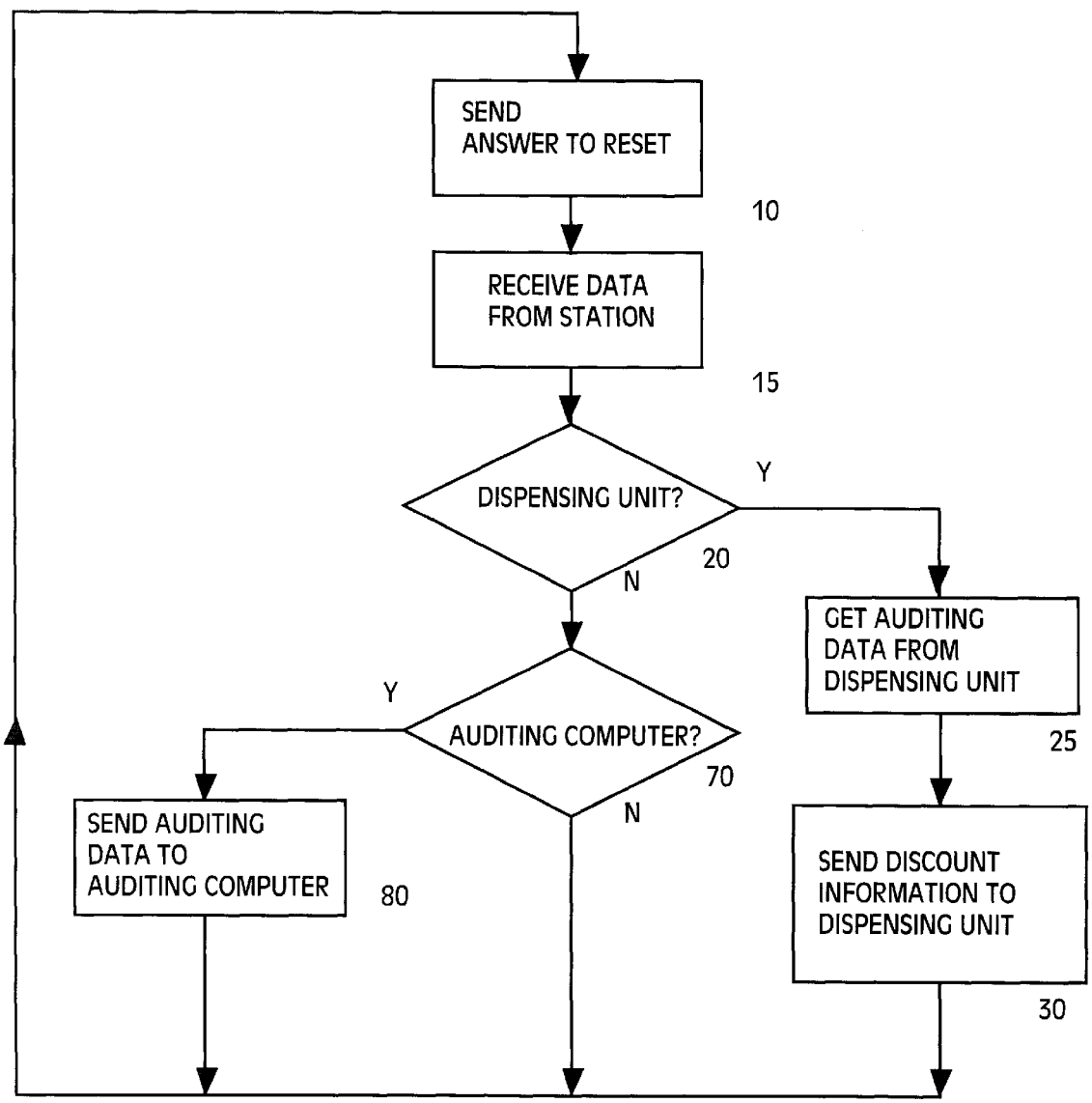
FIG. 26 is a flow chart of a processing performed by the alternative auditing card shown in FIG. 25.

FIG. 26 shows a processing performed by CPU 2450 and program 2665 in auditing/programming card 65. After auditing/programming card 65 is reset through contacts 2420, auditing/programming card 65 sends authorization data 2468 and authorization data 2658 in an answer-to-reset data block in accordance with the ISO standard ISO/IEC 7816-3: 1989(E), cited above (step 10). Auditing/ programming card 65 then receives a block of data through contact 2427 (step 15). If the block contains a station-type code indicating a dispensing unit (step 20), the auditing/ programming card 65 card then receives the signal including dispensing list 132 (step 25, and sends discount data 2555 (step 30).

In summary auditing/programming card 65 sends a signal to dispensing unit 115 to change the product corresponding to the second signal.

Each dispensing unit in the first preferred system identical hardware to that of dispensing unit 115. Each dispensing unit executes a program to perform the identical processing as that of dispensing unit 115.

In store 305, instead of mailing loaded auditing cards to center 500, store personnel insert the loaded auditing card into a card reader within store 305. A processor within store 305 then reads the audit card signal and send a corresponding signal to auditing center 500 via telephone signal path 320.

Second Preferred Embodiment

Figure 27:
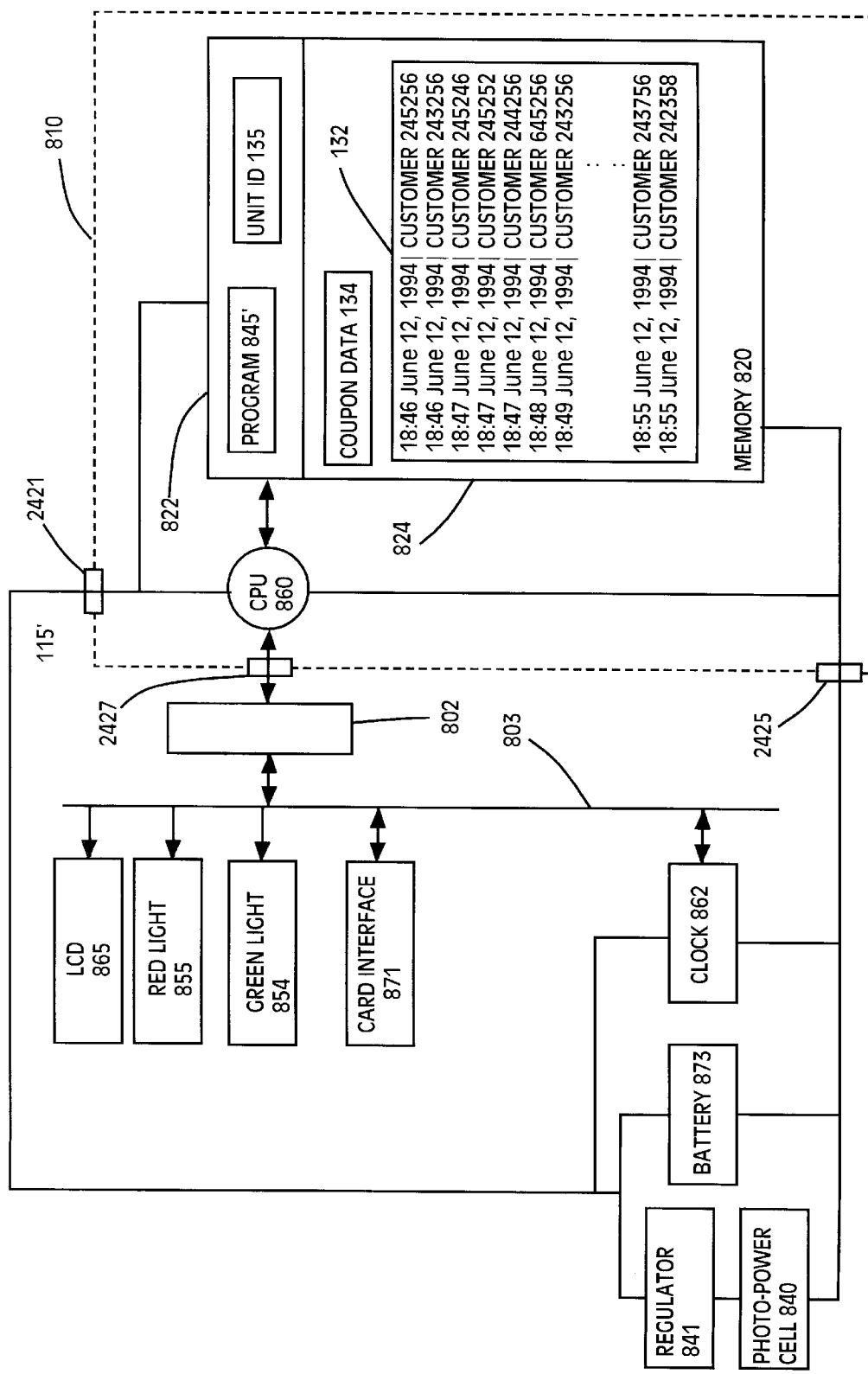
FIG. 27 is a block diagram of a dispensing unit of a second preferred embodiment of the invention.

FIG. 27 shows a block diagram of dispensing unit 115' according to a second preferred embodiment of the present invention. Dispensing unit 115' includes memory 820 having a read only memory (ROM) area 822 for storing a program 845', executed by CPU 860. Each dispensing unit of the second preferred embodiment is similar to dispensing unit 115'. Other features of the second preferred embodiment are similar to those of the first preferred embodiment.

Figure 28:
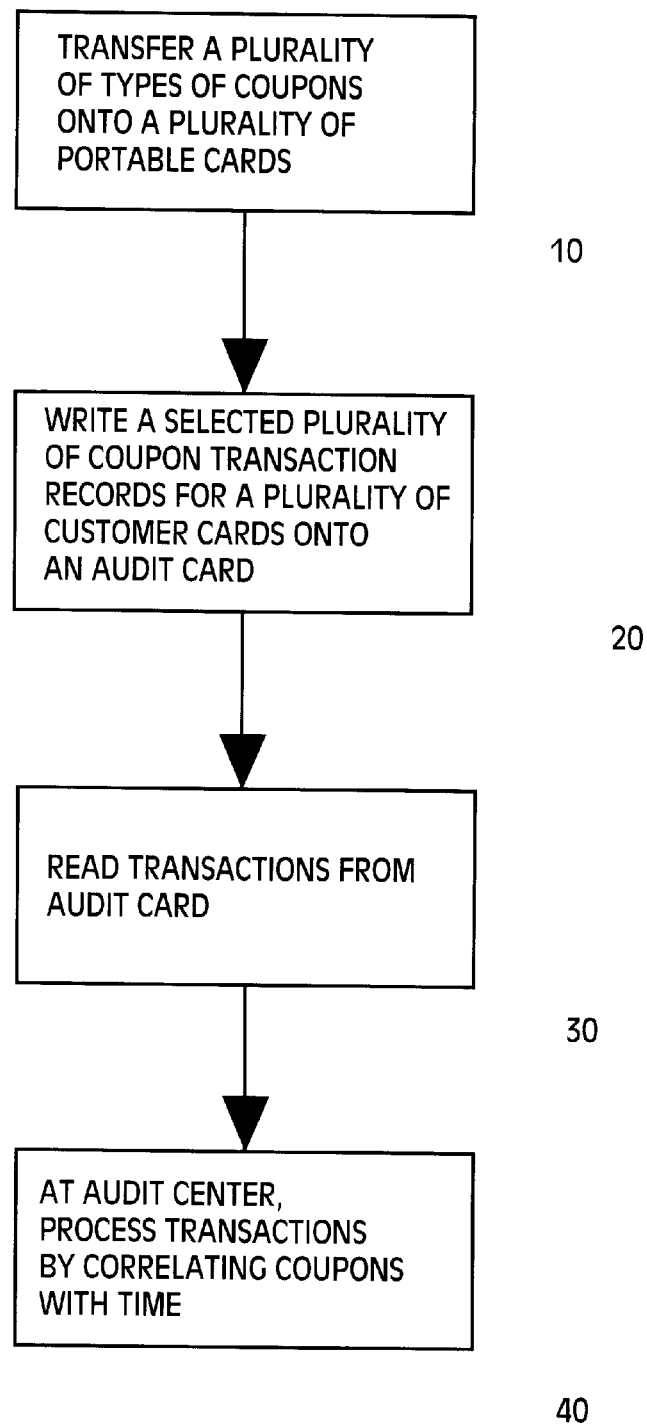
FIG. 28 is a flow chart of a processing performed by the second preferred embodiment of the present invention.

FIG. 28 shows a processing performed by the second preferred embodiment. The processing of FIG. 28 is similar to that of FIG. 11, described above in connection with the first preferred embodiment, except that step 20 of FIG. 28 does not necessarily write all transaction records to the audit card. Instead, to conserve memory, step 10 filters some coupon transactions out of list 132. Step 20 reads list 132 as a circular list, and writes all transactions between the indices stored in the variables TRAILING and LEADING.

Figure 29:
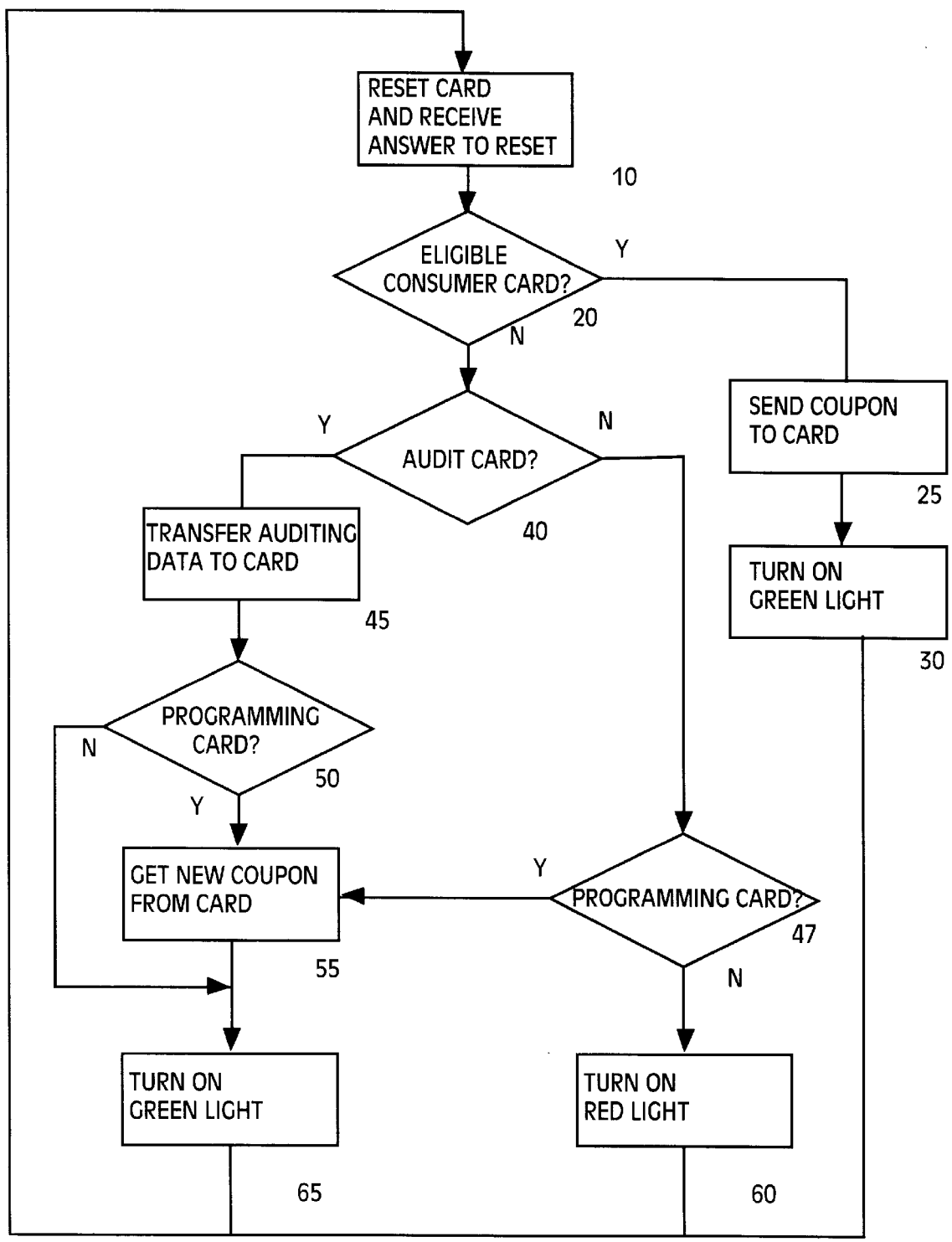
FIG. 29 is another flow chart showing an aspect of the processing of the dispensing unit shown in FIG. 27.

FIG. 29 shows a processing performed by processor 860 and program 845' in dispensing unit 115', to effect steps 10 and 20 of FIG. 28. The processing of step 45 of FIG. 29 is similar to that of step 45 of FIG. 12, described above in connection with the first preferred embodiment. In addition, step 45 of FIG. 29 performs the variable assignment LEADING=TRAILING=0. The processing of step 25 of FIG. 29 is similar to that of step 25 of FIG. 12, described above in connection with the first preferred embodiment, with the additional processing described in FIG. 30.

Figure 30:
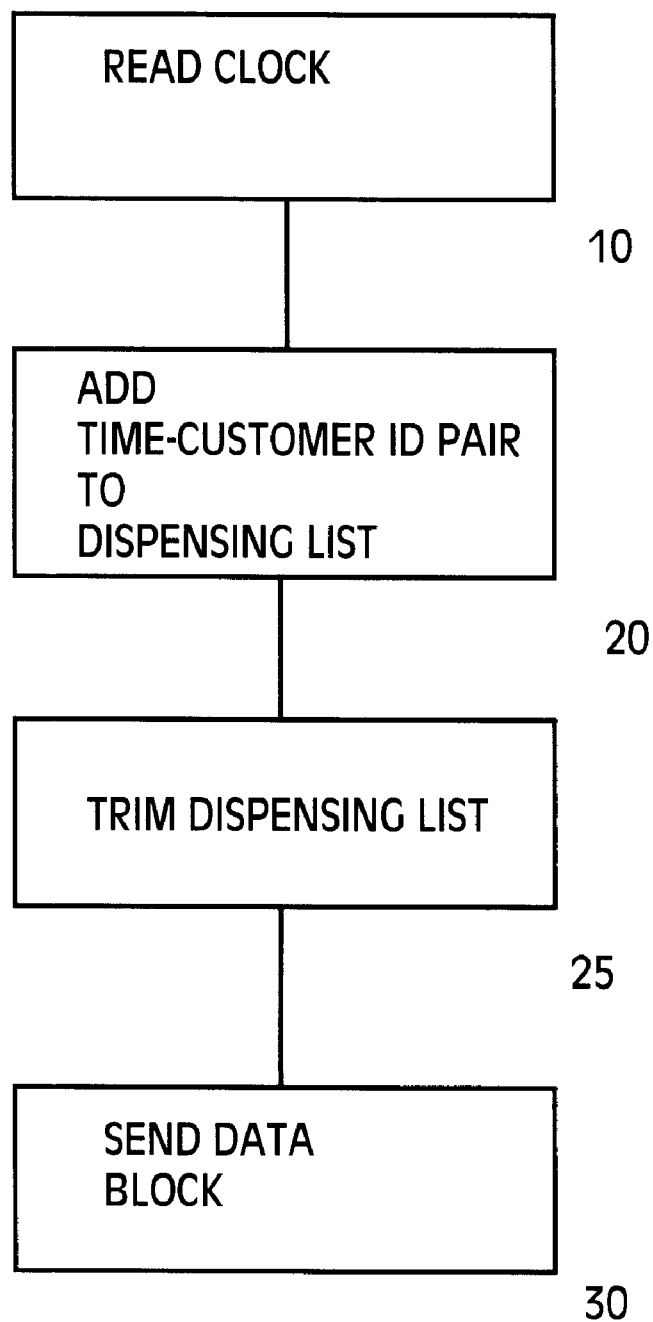
FIG. 30 is another flow chart showing the processing of a step shown in FIG. 29 in more detail.

FIG. 30 shows the processing of step 25 of FIG. 29, sending a coupon to a customer card, in more detail. Processor 860 reads the date-time clock 862 (step 10) and adds a record to dispensing list 132. (step 20). The record includes the read date-time and the customer identification data 2467.

In step 20 of FIG. 30, CPU 860 executes the following instructions:

T_ARRAY [LEADING, TIME]=time read in step 10

T_ARRAY [LEADING, CUSTOMER_ID]=customer ID data 2467

LEADING=(LEADING+1) MODULO LIST_SIZE wherein T_ARRAY is an array of the records in list 132, the first record being accessible using an index of 0. Each record includes a TIME field for storing the date and time at which a coupon was dispensed. Each record also includes a CUSTOMER_ID field for recording the customer to whom the coupon was dispensed. MODULO is a function that returns the integer remainder of dividing the left argument by the right argument. LIST_SIZE is the size of list 132 in dispensing unit 115'. Thus, the instruction, LEADING= (LEADING+1) MODULO LIST_SIZE implements a circular buffer.

In step 25 of FIG. 30, CPU 860 conditionally trims the tail of the circular buffer by executing the following instructions:

```
IF DIFFERENCE (T_ARRAY [TRAILING, TIME],
    T_ARRAY [LEADING-1, TIME])>15 ! interval>15
    minutes
    AND
    LEADING—TRAILING+1 <50! less than 50 transac-
    tions in interval
THEN
    TRAILING=(TRAILING+1) MODULO LIST_SIZE;
    ! trim list
```

The function DIFFERENCE takes two arguments in the date-time format of the records in list 132, and returns the difference in units of minutes.

Processor 860 then sends to the customer card a data block containing a type code indicating a dispensing unit, and coupon data 134. (step 30). Thus, processor 860 writes coupon data 134 into EEPROM 2462 of card 215.

Thus, dispensing unit 115' includes arithmetic circuitry for performing the arithmetic operations described above. Before service worker 50 creates a signal to dispensing unit 115' by inserting auditing card 120, dispensing unit 115' stores the third signal, and reduces a length of the third signal using the arithmetic circuitry.

Thus, the dispensing units of the second preferred system filters some dispensing transactions from the transaction list, thereby conserving memory in the dispensing unit and in the audit card.

Thus, the first and second preferred systems each include a plurality of retail stores, each store having a coupon-dispensing unit for writing electronic coupons onto portable IC cards carried by each customer. To audit the system, store personnel insert an auditing card into the coupon-dispensing units, to collect the dates and recipients of coupon-dispensing transactions.

Although the preferred system employs an audit card, having an interface compatible with the customer card interface on each dispensing unit, the invention may be practiced with other types of auditing interfaces, disengaged from the dispensing unit except when auditing is performed. For example, instead of an audit card, a service worker may carry a portable computer that temporarily connects to the dispensing unit with a cable. With this cable scheme, the service worker creates a signal path to the dispensing unit by plugging the cable into the dispensing unit. The portable computer then receives an audit signal, through the cable, from the dispensing unit. Subsequently, the service worker breaks the signal path by disconnecting the cable from the dispensing unit.

Although the illustrated cards have been shown with a relatively simple memory organization, more involved memory organizations are possible, allowing a single card to function in other applications in addition to functioning in an embodiment of the invention.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of Applicants' general inventive concept. The invention is defined in the following claims.

What is claimed is:

1. A method for a system including a plurality of first cards each having a first memory and respective first signal, a second card, a first computer that receives from the second card, and a store including a plurality of products, a central computer, and a checkout station having an electromagnetic detector and a checkout computer, the method comprising the step of:

sending a second signal to the first memory of a card in the plurality of first cards, the second signal corresponding to one of the plurality of products, and the following steps, performed in the store, of:

communicating product data between the central computer and the checkout computer;

receiving the first signal from the card in the plurality of first cards;

sending the first signal to the second card;

receiving, in the checkout computer, second signals from the card in the plurality of first cards;

receiving a third signal from the electromagnetic detector, the third signal corresponding to a product in the store; and determining a price depending on whether the third signal corresponds to one of the received second signals.

2. The method of claim 1 wherein sending the first signal, from the second card to the first computer, includes sending a time signal to the first computer.

3. The method of claim 2 further including generating the time signal; and reducing a length of the time signal.

4. The method of claim 1 wherein the store includes a plurality of interfaces, and the step of sending a second signal is performed in one of the interfaces.

5. The method of claim 1 wherein the store includes a plurality of interfaces, and the step of sending a second signal includes the step, performed in one of the interfaces, of receiving the second signal from the second card.

6. The method of claim 1 wherein the store includes a plurality of interfaces, and the step of sending a second signal includes the step, performed in one of the interfaces, of receiving the second signal from the second card after the interface detects the card in the plurality of first cards.

7. The method of claim 1 wherein the store includes a plurality of interfaces, and the step of the sending a second signal includes sending the second signal from one of the interfaces, at a time when the second card is touching one of the interfaces.

8. The method of claim 1 wherein the store includes a plurality of interfaces, wherein the step of sending the first signal to the second card includes sending a signal identifying one of the interfaces.

9. The method of claim 1 further including sending the first signal from the second card to the first computer, by sending the second card out of the store.

10. The method of claim 1 wherein the system further includes a third card, and the method further includes sending the first signal from the second card to the computer by sending the first signal to the third card, and sending the first signal from the third card to the computer.

11. A store for a system including a plurality of first cards each having a first memory and respective first signal, a second card, and a first computer that receives from the second card, the store comprising:

a plurality of products;

a central computer;

a checkout station including an electromagnetic detector for generating a third signal corresponding to a product, a checkout computer that communicates product data between the checkout computer and the central computer, and receives second signals from a card in the plurality of first cards;

a determiner that determines a price depending on whether the third signal corresponds to one of the received second signals;

a receiver that receives a first signal from the card in the plurality of first cards; and a sender that sends the first signal to the second card.

12. The store of claim 11 wherein the receiver and sender are part of an interface having an electrical contact for touching the first card, and for touching the second card.

13. The store of claim 11 further including an interface that receives the second signal from the second portable card.

14. The store of claim 11 further including a clock to generate a time signal for sending to the second card.

15. The store of claim 14 further including logic to reduce a length of the time signal.

16. The store of claim 11 wherein the sender is configured to send a signal, identifying the interface, to the second card.

17. A card processing system in a system including a plurality of first cards each having a first memory and respective first signal, a second card, a first computer that receives from the second card, and a store including a plurality of products, a central computer, and a checkout station having an electromagnetic detector and a checkout computer that communicates product data between the central computer and the checkout computer, the card processing system comprising:

means for receiving the first signal from a card in the plurality of first cards;

means for sending the first signal to the second card;

means for receiving second signals from the card in the plurality of first cards;

means for receiving a third signal from the electromagnetic detector, the third signal corresponding to a product in the store; and means for determining a price depending on whether the third signal corresponds to one of the received second signals.

18. The card processing system of claim 17 wherein the means for sending the first signal includes means for sending a time signal.

19. The card processing of claim 18 further including means for generating the time signal; and means for reducing a length of the time signal.

20. The card processing system of claim 17 further including an interface with a sender for sending a second signal to the card in the plurality of first cards, the interface acting to receive, the second signal from the second card.

21. The card processing system of claim 17 further including an interface with a sender for sending a second signal to the card in the plurality of first cards, the interface acting to receive the second signal from the second card after the interface detects the card in the plurality of first cards.

22. The card processing system of claim 17 further including an interface with a sender for sending a second signal to the card in the plurality of first cards, the sender acting to send the second signal at a time when the second card is touching the interface.

23. The card processing system of claim 17 wherein the means for sending the first signal to the second card includes means for generating a signal identifying the interface.

24. A store for a system including a plurality of first cards each having a first memory and respective first signal, a second card, and a first computer that receives from the second card, the store comprising:

a plurality of products;

a central computer;

a checkout station including means for generating a third signal corresponding to a product, means for communicating product data with the central computer, and means for receiving second signals from a card in the plurality of first cards, means for determining a price depending on whether the third signal corresponds to one of the received second signals;

means for receiving a first signal from the card in the plurality of first cards; and means for sending the first signal to the second card.

25. The store of claim 24 wherein the means for receiving and means for sending are part of an interface having an electrical contact for touching the first card, and for touching the second card.

26. The store of claim 24 wherein the interface includes means for receiving the second signal from the second portable card.

27. The store of claim 24 further including means for generating a time signal for sending to the second card.

28. The store of claim 27 further means for reducing a length of the time signal.

29. The store of claim 24 wherein the means for sending includes means for identifying an interface.

* * * * *